US011563980B2

(12) United States Patent
Chang et al.

(10) Patent No.: US 11,563,980 B2
(45) Date of Patent: Jan. 24, 2023

(54) GENERAL CONSTRAINT INFORMATION SYNTAX IN VIDEO CODING

(71) Applicant: QUALCOMM Incorporated, San Diego, CA (US)

(72) Inventors: Yao-Jen Chang, San Diego, CA (US); Vadim Seregin, San Diego, CA (US); Yong He, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/219,147

(22) Filed: Mar. 31, 2021

(65) Prior Publication Data
US 2021/0314623 A1    Oct. 7, 2021

Related U.S. Application Data

(60) Provisional application No. 63/004,296, filed on Apr. 2, 2020.

(51) Int. Cl.
*H04N 19/70* (2014.01)
*H04N 19/136* (2014.01)
*H04N 19/159* (2014.01)

(52) U.S. Cl.
CPC .......... *H04N 19/70* (2014.11); *H04N 19/136* (2014.11); *H04N 19/159* (2014.11)

(58) Field of Classification Search
CPC .... H04N 19/70; H04N 19/136; H04N 19/159; H04N 19/179; H04N 19/186
See application file for complete search history.

(56) References Cited

U.S. PATENT DOCUMENTS

2014/0023142 A1* 1/2014 Yu ................ H04N 19/513
  375/240.16
2015/0264366 A1* 9/2015 Hendry .............. H04N 19/68
  375/240.01

(Continued)

FOREIGN PATENT DOCUMENTS

WO   WO-2021112950 A1 *  6/2021 .......... H04N 19/103
WO   WO-2021202178 A1 * 10/2021

OTHER PUBLICATIONS

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7, 2020-Jan. 17, 2020, Document: JVET-Q2001-vE, No. JVET-Q2001, m52905, Jan. 22, 2020 (Jan. 22, 2020), XP030285390, 515 pages, Retrieved from the Internet: URL: http://phenix.int-evry.fr/jvet/doc_end_user/documents/17_Brussels/wg11/JVET-Q2001-v15.zip JVET-Q2001-vE.docx [retrieved on Mar. 12, 2020] section "7.3.2.3 Sequence parameter set RBSP syntax", sections 8.8.5.2 and 8.8.5.4 tables 45. 46 equations 1502-1504 equations 1461-1463, pp. 38-42, section 7.1, sections 7.3.3.2 and 7.4.4.2, section 7.4.3.3, section C.4, cited in the application, paragraph [7.4.8.2], paragraph [8.3.2], cited in the application, the whole document.

(Continued)

*Primary Examiner* — Richard A Hansell, Jr.
(74) *Attorney, Agent, or Firm* — Shumaker & Sieffert, P.A.

(57) ABSTRACT

A method of processing video data comprises performing a bitstream conformance process that determines whether a bitstream that comprises an encoded representation of the video data conforms to a video coding standard, wherein the bitstream conformance process determines that the bitstream does not conform to the video coding standard when at least one of: a chroma-related constraint flag is equal to 0 and when there are no chroma components for pictures in the (Continued)

bitstream, or an inter prediction-related constraint flag is equal to 0 when all slices of the bitstream are I slices.

17 Claims, 7 Drawing Sheets

(56) References Cited

U.S. PATENT DOCUMENTS

| | | | | |
|---|---|---|---|---|
| 2015/0264369 | A1* | 9/2015 | Ramasubramonian | ............... H04N 19/70 375/240.25 |
| 2015/0312584 | A1* | 10/2015 | Boyce | ............... H04N 19/30 375/240.16 |
| 2016/0134868 | A1* | 5/2016 | He | ............... H04N 19/186 375/240.02 |
| 2021/0092446 | A1* | 3/2021 | Choi | ............... H04N 19/33 |
| 2021/0211700 | A1* | 7/2021 | Li | ............... H04N 19/46 |

OTHER PUBLICATIONS

Chang Y-J (QUALCOMM) et al., "AhG9: On General Constraint Information Syntax", 130. MPEG Meeting, Apr. 20, 2020-Apr. 24, 2020, ALPBACH, (Motion Picture Expert Group or ISO/IEC JTC1/SC29/WG11), No. m53263, JVET-R0286 Apr. 4, 2020 (Apr. 4, 2020), XP030286379, pp. 1-5, Retrieved from the Internet: URL:http://phenix.int-evry.fr/mpeg/doc_end_user/documents/130_Alpbach/wg11/m53263-JVET-R0286-v1-JVET-R0286-v1.zip JVET-R0286-v1/JVET-R0286.docx [retrieved on Apr. 4, 2020] sections 2-4.

International Search Report and Written Opinion—PCT/US2021/025391—ISA/EPO—dated Jun. 29, 2021 12 Pages.

ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.

Naser K., (Interdigital) et al., "AhG 9: Cleanup of Constraint Flags", 130, MPEG Meeting, Apr. 20, 2020-Apr. 24, 2020, ALPBACH, (Motion Picture Expert Group or ISO/IEC JTC1/SC29/WG11), No. m53148, JVET-R0173-r2, Apr. 8, 2020 (Apr. 8, 2020), XP030286113, pp. 1-8, Retrieved from the Internet: URL:http://phenix.int-evry.fr/mpeg/doc_end_user/documents/130_Alpbach/wg11/m53148-JVET-R0173-v2-JVET-R0173-r1.zip JVET-R0173-r1.docx [retrieved on Apr. 8, 2020] sections 2 and 3.

* cited by examiner

GENERAL CONSTRAINT INFORMATION SYNTAX IN VIDEO CODING

This application claims the benefit of U.S. Provisional Patent Application 63/004,296, filed Apr. 2, 2020, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for general constraint information syntax signaling for video coding. The techniques of this disclosure may be applied in the Versatile Video Coding (VVC) standard and other future video coding standards. As described herein, this disclosure describes techniques that may enable devices to correctly determine whether a video decoder is configured to decode a bitstream. Making this determination may potentially enable the video decoder to decode more bitstreams than if the determination was made incorrectly.

In one example, this disclosure describes a method of processing video data, the method comprising: performing a bitstream conformance process that determines whether a bitstream that comprises an encoded representation of the video data conforms to a video coding standard, wherein the bitstream conformance process determines that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices.

In another example, this disclosure describes a device for processing video data, the device comprising: a memory to store a bitstream that comprises an encoded representation of the video data conforms to a video coding standard; and one or more processors implemented in circuitry and coupled to the memory, the one or more processors configured to perform a bitstream conformance process that determines whether the bitstream conforms to a video coding standard, wherein the bitstream conformance process determines that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices.

In another example, this disclosure describes a device for processing video data, the device comprising: means for storing a bitstream that comprises an encoded representation of the video data; and means for performing a bitstream conformance process that determines whether the bitstream conforms to a video coding standard, wherein the bitstream conformance process determines that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices.

In another example, this disclosure describes a computer-readable storage medium having stored thereon instructions that, when executed, cause one or more processors to store a bitstream that comprises an encoded representation of the video data; and perform a bitstream conformance process that determines whether the bitstream conforms to a video coding standard, wherein the bitstream conformance process determines that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices.

In another example, this disclosure describes a method of processing video data, the method comprising: performing a bitstream conformance process that determines whether a bitstream that comprises an encoded representation of the video data conforms to a video coding standard, wherein the bitstream conformance process is able to determine that the bitstream conforms to the video coding standard regardless of a value of a first syntax element when a second syntax element indicates that only one slice is allowed per picture, the first syntax element indicating whether only one subpicture is allowed per subpicture.

In another example, this disclosure describes a method of processing video data, the method comprising: performing a bitstream conformance process that determines whether a bitstream that comprises an encoded representation of the video data conforms to a video coding standard, wherein the bitstream conformance process determines that the bitstream does not conform to the video coding standard when a chroma-related constraint flag is equal to 0 and when there are no chroma components for pictures in the bitstream.

In another example, this disclosure describes a method of processing video data, the method comprising: performing a bitstream conformance process that determines whether a bitstream that comprises an encoded representation of the video data conforms to a video coding standard, wherein the bitstream conformance process determines that the bitstream does not conform to the video coding standard when an inter prediction-related constraint flag is equal to 0 when all slices of the bitstream are I slices.

In another example, this disclosure describes a method of processing video data, the method comprising: determining that a first syntax element is omitted from a bitstream and inferred to be equal to 1 based on a second syntax element indicating there are no chroma components in the bitstream and a third syntax element indicating that all slices of the bitstream are I slices, the first syntax element being one of: a no_qtbtt_dual_tree_intra_constraint_flag, a no_ccalf_constraint_flag, a no_joint_cbcr_constraint_flag, a no_cclm_constraint_flag a no_ref_wraparound_constraint_flag, a no_temporal_mvp_constraint_flag, a no_sbtmvp_constraint_flag, a no_amvr_constraint_flag, a no_bdof_constraint_flag, a no_dmvr_constraint_flag, a no_affine_motion_constraint_flag, a no_bcw_constraint_flag, a no_ciip_constraint_flag, a no_fpel_mmvd_constraint_flag, or a no_gpm_constraint_flag' performing a bitstream conformance process that determines whether a bitstream that comprises an encoded representation of the video data conforms to a video coding standard based on the first syntax element.

In another example, this disclosure describes a method of processing video data, the method comprising: performing a bitstream conformance process that determines whether a bitstream that comprises an encoded representation of the video data conforms to a video coding standard, wherein the bitstream conformance process determines, based on a first syntax element in a sequence parameter set (SPS) indicating that a coding tool is enabled, that the bitstream does not conform to the video coding standard when a second syntax element of the bitstream indicates that the first syntax element shall have a value indicating that the coding tool is not enabled.

In another example, this disclosure describes a method of processing video data, the method comprising: performing a bitstream conformance process that determines whether a bitstream that comprises an encoded representation of the video data conforms to a video coding standard, wherein the bitstream conformance process determines that the bitstream does not conform to the video coding standard based on a first syntax element having a particular value indicating a requirement of bitstream conformance is applicable and based on the requirement of bitstream conformance not being satisfied, wherein the requirement of bitstream conformance specifies one of: a second syntax element specifies a video parameter set (VPS) identifier of a sequence parameter set (SPS) shall be equal to 0, the second syntax element shall be equal to 0 and a third syntax element, plus 1, specifies that a maximum number of temporal sublayers that may be present in each coded layer video sequence (CLVS) shall be equal to 0, the third syntax element shall be equal to 0, or a fourth syntax element shall specify that all layers in a coded video sequence (CVS) are independently coded without inter-layer prediction.

In another example, this disclosure describes a method of processing video data, the method comprising: performing a bitstream conformance process that determines whether a bitstream that comprises an encoded representation of the video data conforms to a video coding standard, wherein the bitstream conformance process determines that the bitstream does not conform to the video coding standard based on a first syntax element having a particular value indicating a requirement of bitstream conformance is applicable and based on the requirement of bitstream conformance not being satisfied, wherein the requirement of bitstream conformance specifies one of: there shall be no Network Abstraction Layer (NAL) unit in the bitstream with a NAL unit type equal to a Video Parameter Set (VPS) NAL unit type in an in-scope output layer set, or there shall be no NAL unit in the bitstream with a picture header NAL unit type in the in-scope output layer set.

In another example, this disclosure describes a device for processing video data, the device comprising one or more means for performing any such method. A computer-readable storage medium having stored thereon instructions that, when executed, cause one or more processors to perform any such method.

The details of one or more examples are set forth in the accompanying drawings and the description below. Other features, objects, and advantages will be apparent from the description, drawings, and claims.

DETAILED DESCRIPTION

As described herein, VVC specifies that a video encoder may include a set of general constraint flags in a bitstream. The general constraint flags may include chroma-related constraint flags and inter prediction-related constraint flags. The constraint flags may specify which coding tools are used in the bitstream. However, the chroma-related constraint flags should not indicate that chroma-related coding tools may be used in the bitstream when no chroma components are used in pictures of the bitstream. Similarly, the intra prediction-related constraint flags should not indicate that inter prediction-related coding tools may be used in the bitstream when the bitstream only includes I slices. If a video coder is not configured to use a chroma-related coding tool or inter prediction-related coding tool, providing an indication that the chroma-related coding tool or the inter prediction-related coding tool may be used in the bitstream when the chroma-related coding tool or inter prediction-related coding tool may not actually be used in the bitstream may cause the video decoder or other device to erroneously determine that the video decoder is unable to decode the bitstream. This may limit the functionality of the video decoder.

To address this technical issue, this disclosure describes techniques that impose specific constraints on the values of chroma-related constraint flags and inter prediction-related constraint flags. These constraints may be verified in a bitstream conformance process. Thus, in accordance with one or more techniques of this disclosure, a device may perform a bitstream conformance process that determines whether a bitstream that comprises an encoded representation of the video data conforms to a video coding standard. The bitstream conformance process determines that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices. In some examples, if the bitstream does not conform to the video coding standard, the device does not forward the bitstream to a video decoder for decoding.

Figure 1:
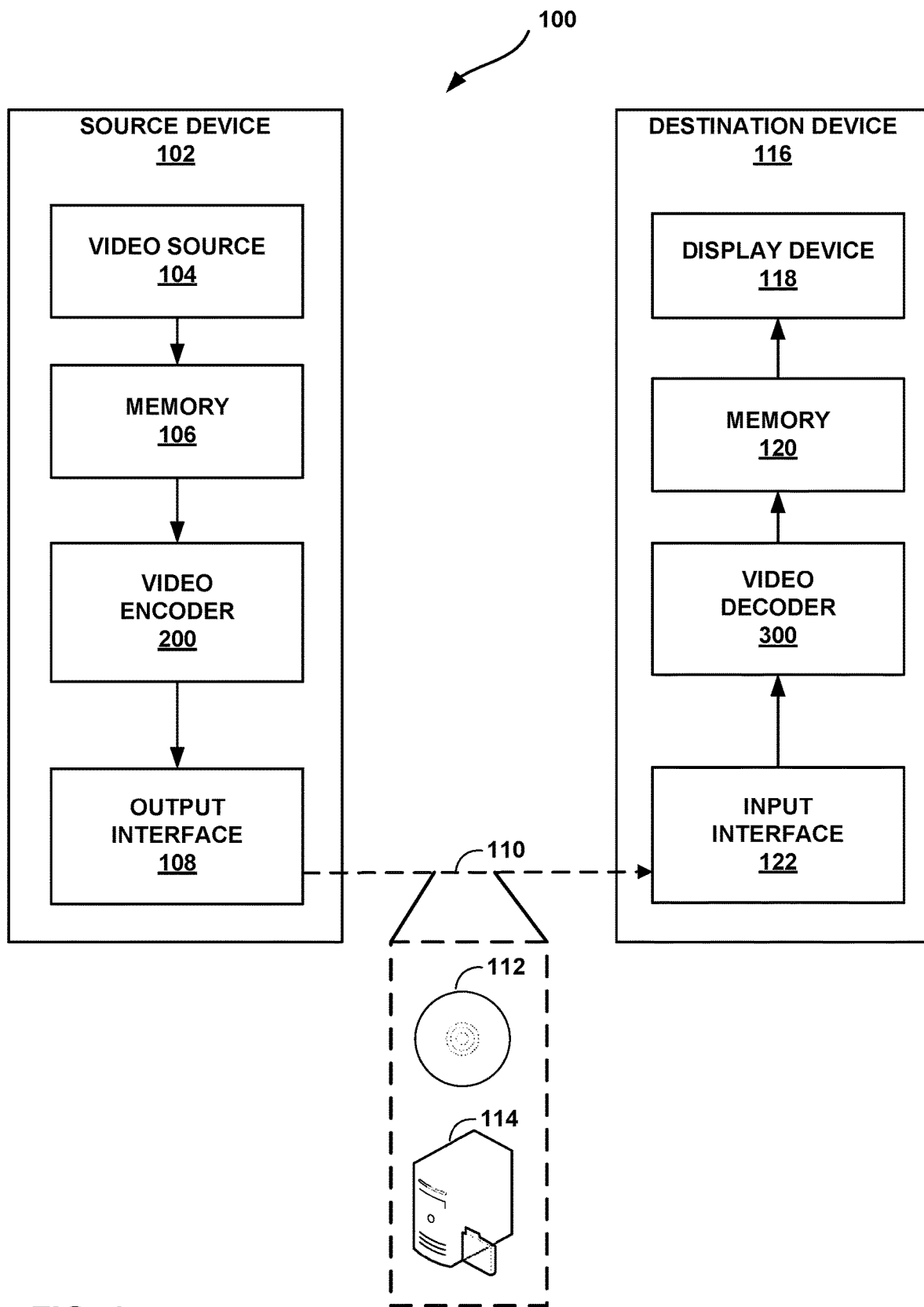
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques related to general constraint information syntax in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques related to general constraint information syntax in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In other words, memories 106, 120 may store a bitstream that comprises an encoded representation of video data. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vE (hereinafter "VVC Draft 8"). The reference software is called VVC Test Model (VTM). Subclause 7.3.3.2 and Subclause 7.4.4.2 in VVC Draft 8 version 15 are investigated and improved in this disclosure. There are several proposed changes in this disclosure. At least one proposed change below or a combination of at least two proposed changes below can be applied to the current VVC Working Draft, i.e., JVET-Q2001. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
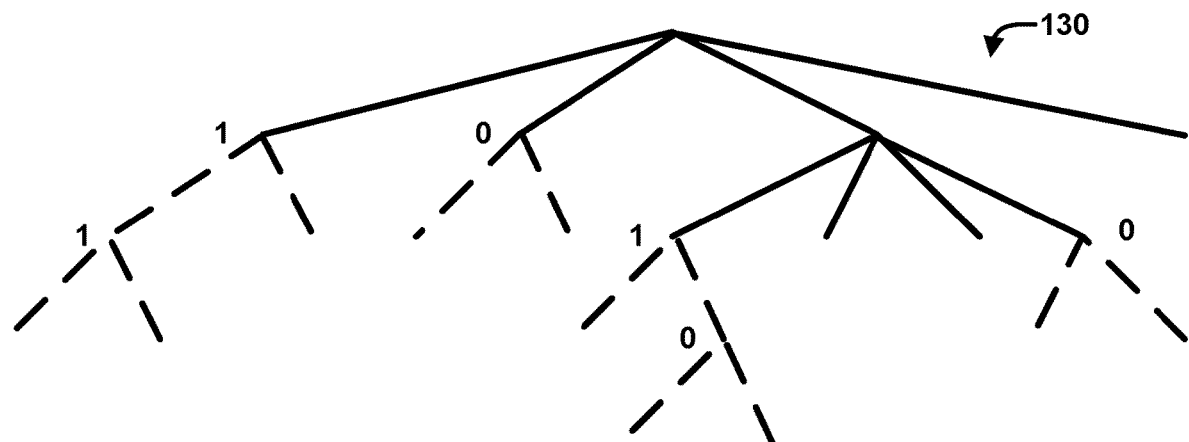
FIGS. 2A and 2B are conceptual diagrams illustrating an example quadtree binary tree (QTBT) structure, and a corresponding coding tree unit (CTU).
Figure 2B:
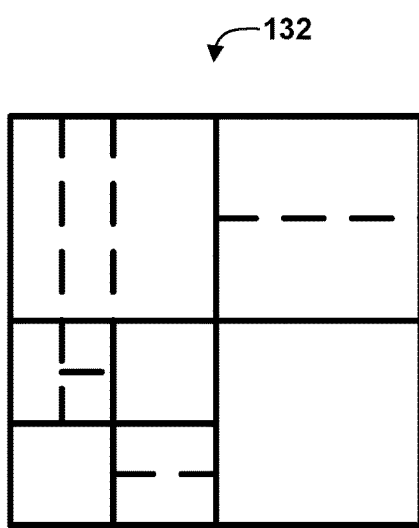

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

As mentioned above, if a video coder is not configured to use a chroma-related coding tool or inter prediction-related coding tool, providing an indication that the chroma-related coding tool or the inter prediction-related coding tool may be used in the bitstream when the chroma-related coding tool or inter prediction-related coding tool may not actually be used in the bitstream may cause the video decoder or other device to erroneously determine that the video decoder is unable to decode the bitstream. This may limit the functionality of the video decoder. This disclosure provides several proposals to improve the general constraint information syntax:

(1) Semantics improvement for general constraint flags. This disclosure describes two example solutions:
   a. Solution 1: Remove the bitstream conformance "When one_slice_per_pic_constraint_flag is equal to 1, the value of one_subpic_per_pic_constraint_flag shall be equal to 1".
   b. Solution 2: Constrain the chroma-related constraint flags to be equal to 1 when max_chroma_format_constraint_idc is equal to 0 (i.e., when there are no chroma components). Constrain the inter prediction-related constraint flags to be equal to 1 when intra_only_constraint_flag is equal to 1 (i.e., when slice_type are I for all slices).

(2) Add general constraint flags for the coding tools.

(3) Add general constraint flags for the single layer and single sublayer.

(4) Add general constraint flags for the VPS and PH.

In VVC Draft 8, one_slice_per_pic_constraint_flag equal to 1 specifies that each picture shall contain only one slice. one_slice_per_pic_constraint_flag equal to 0 does not impose such a constraint. Furthermore, in VVC Draft 8, one_subpic_per_pic_constraint_flag equal to 1 specifies that each picture shall contain only one subpicture. one_subpic_per_pic_constraint_flag equal to 0 does not impose such a constraint. When one_slice_per_pic_constraint_flag is equal to 1, the value of one_subpic_per_pic_constraint_flag shall be equal to 1.

In the current general constraint syntax design, there is a bitstream conformance to constrain one_subpic_per_pic_constraint_flag by one_slice_per_pic_constraint_flag as follows:

When one_slice_per_pic_constraint_flag is equal to 1, the value of one_subpic_per_pic_constraint_flag shall be equal to 1.

If there is no such conformance constraint to one_subpic_per_pic_constraint_flag, there is no bug (error) to video decoder 300 from high-level parameter sets to low-level decoding process, but it might be beneficial to avoid a product to set up a profile which is not reasonable at all. Therefore, this proposal provides two examples to address the issue:

Example 1

Remove the bitstream conformance "When one_slice_per_pic_constraint_flag is equal to 1, the value of one_subpic_per_pic_constraint_flag shall be equal to 1".

Thus, in some such examples, a device (e.g., source device 102, destination device 116, etc.) may perform a bitstream conformance process that determines whether a bitstream that comprises an encoded representation of the video data conforms to a video coding standard, wherein the bitstream conformance process determines that the bitstream does not conform to the video coding standard when a chroma-related constraint flag is equal to 0 and when there are no chroma components for pictures in the bitstream.

Example 2

Constrain the chroma-related constraint flags to be equal to 1 when max_chroma_format_constraint_idc is equal to 0 (i.e., when there is no chroma components). Constrain the inter prediction-related constraint flags to be equal to 1 when intra_only_constraint_flag is equal to 1 (i.e., when slice_type shall be I for all slices). The proposed changes to VVC 8 are shown by the <!> . . . </!> tags as follows in Table 1:

TABLE 1 no_qtbtt_dual_tree_intra_constraint_flag equal to 1 specifies that qtbtt_dual_tree_intra_flag shall be equal to 0.
no_qtbtt_dual_tree_intra_constraint_flag equal to 0 does not impose such a constraint. <!>When max_chroma_format_constraint_idc is equal to 0, the value of no_qtbtt_dual_tree_intra_constraint_flag shall be equal to 1.</!>
no_ccalf_constraint_flag equal to 1 specifies that sps_ccalf_enabled_flag shall be equal to 0. no_ccalf_constraint_flag equal to 0 does not impose such a constraint. <!>When max_chroma_format_constraint_idc is equal to 0, the value of no_ccalf_constraint_flag shall be equal to 1.</!>
no_joint_cbcr_constraint_flag equal to 1 specifies that sps_joint_cbcr_enabled_flag shall be equal to 0. no_joint_cbcr_constraint_flag equal to 0 does not impose such a constraint. <!>When max_chroma_format_constraint_idc is equal to 0, the value of no_joint_cbcr_constraint_flag shall be equal to 1.</!>
no_ref_wraparound_constraint_flag equal to 1 specifies that sps_ref_wraparound_enabled_flag shall be equal to 0.
no_ref_wraparound_constraint_flag equal to 0 does not impose such a constraint. <!>When intra_only_constraint_flag is equal to 1, the value of no_ref_wraparound_constraint_flag shall be equal to 1.</!>
no_temporal_mvp_constraint_flag equal to 1 specifies that sps_temporal_mvp_enabled_flag shall be equal to 0.
no_temporal_mvp_constraint_flag equal to 0 does not impose such a constraint. <!>When intra_only_constraint_flag is equal to 1, the value of no_temporal_mvp_constraint_flag shall be equal to 1.</!>
no_sbtmvp_constraint_flag equal to 1 specifies that sps_sbtmvp_enabled_flag shall be equal to 0. no_sbtmvp_constraint_flag equal to 0 does not impose such a constraint. <!>When intra_only_constraint_flag is equal to 1, the value of no_sbtmvp_constraint_flag shall be equal to 1.</!>
no_amvr_constraint_flag equal to 1 specifies that sps_amvr_enabled_flag shall be equal to 0. no_amvr_constraint_flag equal to 0 does not impose such a constraint. <!>When intra_only_constraint_flag is equal to 1, the value of no_amvr_constraint_flag shall be equal to 1.</!>
no_bdof_constraint_flag equal to 1 specifies that sps_bdof_enabled_flag shall be equal to 0. no_bdof_constraint_flag equal to 0 does not impose such a constraint. <!>When intra_only_constraint_flag is equal to 1, the value of no_bdof_constraint_flag shall be equal to 1.</!>
no_dmvr_constraint_flag equal to 1 specifies that sps_dmvr_enabled_flag shall be equal to 0. no_dmvr_constraint_flag equal to 0 does not impose such a constraint. <!>When intra_only_constraint_flag is equal to 1, the value of no_dmvr_constraint_flag shall be equal to 1.</!>
no_cclm_constraint_flag equal to 1 specifies that sps_cclm_enabled_flag shall be equal to 0. no_cclm_constraint_flag equal to 0 does not impose such a constraint. <!>When max_chroma_format_constraint_idc is equal to 0, the value of no_cclm_constraint_flag shall be equal to 1.</!>

TABLE 1-continued no_affine_motion_constraint_flag equal to 1 specifies that
sps_affine_enabled_flag shall be equal to 0. no_affine_motion_constraint_flag
equal to 0 does not impose such a constraint. <!>When intra_only_constraint_flag
is equal to 1, the value of no_affine_motion_constraint_flag shall be equal to
1.</!>
no_bcw_constraint_flag equal to 1 specifies that sps_bcw_enabled_flag shall be
equal to 0. no_bcw_constraint_flag equal to 0 does not impose such a constraint.
<!>When intra_only_constraint_flag is equal to 1, the value of
no_bcw_constraint_flag shall be equal to 1.</!>
no_ciip_constraint_flag equal to 1 specifies that sps_ciip_enabled_flag shall be
equal to 0. no_cipp_constraint_flag equal to 0 does not impose such a constraint.
<!>When intra_only_constraint_flag is equal to 1, the value of
no_cipp_constraint_flag shall be equal to 1.</!>
no_fpel_mmvd_constraint_flag equal to 1 specifies that
sps_fpel_mmvd_enabled_flag shall be equal to 0. no_fpel_mmvd_constraint_flag
equal to 0 does not impose such a constraint. <!>When intra_only_constraint_flag
is equal to 1, the value of no_fpel_mmvd_constraint_flag shall be equal to 1.</!>
no_gpm_constraint_flag equal to 1 specifies that sps_gpm_enabled_flag shall be
equal to 0. no_gpm_constraint_flag equal to 0 does not impose such a constraint.
<!>When intra_only_constraint_flag is equal to 1, the value of
no_gpm_constraint_flag shall be equal to 1.</!>

The semantics of syntax elements mentioned in Table 1, above are provided in Table 2, below.

TABLE 2 qtbtt_dual_tree_intra_flag equal to 1 specifies that, for I slices, each CTU is split
into coding units with 64×64 luma samples using an implicit quadtree split, and these
coding units are the root of two separate coding_tree syntax structure for luma and
chroma. qtbtt_dual_tree_intra_flag equal to 0 specifies separate coding_tree syntax
structure is not used for I slices. When qtbtt_dual_tree_intra_flag is not present, it is
inferred to be equal to 0.
sps_ccalf_enabled_flag equal to 0 specifies that the cross-component adaptive loop
filter is disabled. sps_ccalf_enabled_flag equal to 1 specifies that the cross-
component adaptive loop filter may be enabled.
max_chroma_format_constraint_idc specifies that chroma_format_idc shall be in
the range of 0 to max_chroma_format_constraint_idc, inclusive.
sps_joint_cbcr_enabled_flag equal to 0 specifies that the joint coding of chroma
residuals is disabled. sps_joint_cbcr_enabled_flag equal to 1 specifies that the joint
coding of chroma residuals is enabled. When not present, the value of
sps_joint_cbcr_enabled_flag is inferred to be equal to 0.
sps_ref_wraparound_enabled_flag equal to 1 specifies that horizontal wrap-around
motion compensation is applied in inter prediction. sps_ref_wraparound_enabled_flag
equal to 0 specifies that horizontal wrap-around motion compensation is not applied.
intra_only_constraint_flag equal to 1 specifies that slice_type shall be equal to I.
intra_only_constraint_flag equal to 0 does not impose such a constraint.
sps_temporal_mvp_enabled_flag equal to 1 specifies that temporal motion vector
predictors may be used in the CLVS. sps_temporal_mvp_enabled_flag equal to 0
specifies that temporal motion vector predictors are not used in the CLVS.
sps_sbtmvp_enabled_flag equal to 1 specifies that subblock-based temporal motion
vector predictors may be used in decoding of pictures with all slices having slice_type
not equal to I in the CLVS. sps_sbtmvp_enabled_flag equal to 0 specifies that
subblock-based temporal motion vector predictors are not used in the CLVS. When
sps_sbtmvp_enabled_flag is not present, it is inferred to be equal to 0.
sps_amvr_enabled_flag equal to 1 specifies that adaptive motion vector difference
resolution is used in motion vector coding. amvr_enabled_flag equal to 0 specifies
that adaptive motion vector difference resolution is not used in motion vector coding.
sps_bdof_enabled_flag equal to 0 specifies that the bi-directional optical flow inter
prediction is disabled. sps_bdof_enabled_flag equal to 1 specifies that the bi-
directional optical flow inter prediction is enabled.
sps_dmvr_enabled_flag equal to 1 specifies that decoder motion vector refinement
based inter bi-prediction is enabled. sps_dmvr_enabled_flag equal to 0 specifies that
decoder motion vector refinement based inter bi-prediction is disabled.
sps_affine_enabled_flag specifies whether affine model based motion compensation
can be used for inter prediction. If sps_affine_enabled_flag is equal to 0, the syntax
shall be constrained such that no affine model based motion compensation is used in
the CLVS, and inter_affine_flag and cu_affine_type_flag are not present in coding
unit syntax of the CLVS. Otherwise (sps_affine_enabled_flag is equal to 1), affine
model based motion compensation can be used in the CLVS.
sps_bcw_enabled_flag specifies whether bi-prediction with CU weights can be used
for inter prediction. If sps_bcw_enabled_flag is equal to 0, the syntax shall be
constrained such that no bi-prediction with CU weights is used in the CLVS, and
bcw_idx is not present in coding unit syntax of the CLVS. Otherwise
(sps_bcw_enabled_flag is equal to 1), bi-prediction with CU weights can be used in
the CLVS.
sps_ciip_enabled_flag specifies that ciip_flag may be present in the coding unit

TABLE 2-continued syntax for inter coding units. sps_ciip_enabled_flag equal to 0 specifies that ciip_flag is not present in the coding unit syntax for inter coding units.
ciip_flag[ x0 ][ y0 ] specifies whether the combined inter-picture merge and intra-picture prediction is applied for the current coding unit.
sps_fpel_mmvd_enabled_flag equal to 1 specifies that merge mode with motion vector difference is using integer sample precision. sps_fpel_mmvd_enabled_flag equal to 0 specifies that merge mode with motion vector difference can use fractional sample precision.
sps_gpm_enabled_flag specifies whether geometric partition based motion compensation can be used for inter prediction. sps_gpm_enabled_flag equal to 0 specifies that the syntax shall be constrained such that no geometric partition based motion compensation is used in the CLVS, and merge_gpm_partition_idx, merge_gpm_idx0, and merge_gpm_idx1 are not present in coding unit syntax of the CLVS. sps_gpm_enabled_flag equal to 1 specifies that geometric partition based motion compensation can be used in the CLVS. When not present, the value of sps_gpm_enabled_flag is inferred to be equal to 0.

Thus, in some such examples, a device (e.g., source device 102, destination device 116, etc.) may perform a bitstream conformance process that determines whether a bitstream that comprises an encoded representation of the video data conforms to a video coding standard, wherein the bitstream conformance process determines that the bitstream does not conform to the video coding standard when a chroma-related constraint flag is equal to 0 and when there are no chroma components for pictures in the bitstream. In some examples, the device may perform a bitstream conformance process that determines whether a bitstream that comprises an encoded representation of the video data conforms to a video coding standard, wherein the bitstream conformance process determines that the bitstream does not conform to the video coding standard when an inter prediction-related constraint flag is equal to 0 when all slices of the bitstream are I slices.

In another example, the flags are conditioned by max_chroma_format_constraint_idc=0 and intra_only_constraint_flag=1 as follows:

The signalling of one_subpic_per_pic_constraint_flag is omitted and inferred to be equal to 1 when one_slice_per_pic_constraint_flag is equal to 1.
The signalling of no_qtbtt_dual_tree_intra_constraint_flag is omitted and inferred to be equal to 1 when max_chroma_format_constraint_idc is equal to 0.
The signalling of no_ccalf_constraint_flag is omitted and inferred to be equal to 1 when max_chroma_format_constraint_idc is equal to 0.
The signalling of no_joint_cbcr_constraint_flag is omitted and inferred to be equal to 1 when max_chroma_format_constraint_idc is equal to 0.
The signalling of no_cclm_constraint_flag is omitted and inferred to be equal to 1 when max_chroma_format_constraint_idc is equal to 0.
The signalling of no_ref_wraparound_constraint_flag is omitted and inferred to be equal to 1 when intra_only_constraint_flag is equal to 1.
The signalling of no_temporal_mvp_constraint_flag is omitted and inferred to be equal to 1 when intra_only_constraint_flag is equal to 1.
The signalling of no_sbtmvp_constraint_flag is omitted and inferred to be equal to 1 when intra_only_constraint_flag is equal to 1.
The signalling of no_amvr_constraint_flag is omitted and inferred to be equal to 1 when intra_only_constraint_flag is equal to 1.
The signalling of no_bdof_constraint_flag is omitted and inferred to be equal to 1 when intra_only_constraint_flag is equal to 1.
The signalling of no_dmvr_constraint_flag is omitted and inferred to be equal to 1 when intra_only_constraint_flag is equal to 1.
The signalling of no_affine_motion_constraint_flag is omitted and inferred to be equal to 1 when intra_only_constraint_flag is equal to 1.
The signalling of no_bcw_constraint_flag is omitted and inferred to be equal to 1 when intra_only_constraint_flag is equal to 1.
The signalling of no_ciip_constraint_flag is omitted and inferred to be equal to 1 when intra_only_constraint_flag is equal to 1.
The signalling of no_fpel_mmvd_constraint_flag is omitted and inferred to be equal to 1 when intra_only_constraint_flag is equal to 1.
The signalling of no_gpm_constraint_flag is omitted and inferred to be equal to 1 when intra_only_constraint_flag is equal to 1.

Thus, in some such examples, a device (e.g., source device 102, destination device 116, etc.) may determine that a first syntax element is omitted from a bitstream and inferred to be equal to 1 based on a second syntax element indicating there are no chroma components in the bitstream and a third syntax element indicating that all slices of the bitstream are I slices, the first syntax element being one of: a no_qtbtt_dual_tree_intra_constraint_flag, a no_ccalf_constraint_flag, a no_joint_cbcr_constraint_flag, a no_cclm_constraint_flag, a no_ref_wraparound_constraint_flag, a no_temporal_mvp_constraint_flag, a no_sbtmvp_constraint_flag, a no_amvr_constraint_flag, a no_bdof_constraint_flag, a no_dmvr_constraint_flag, a no_affine_motion_constraint_flag, a no_bcw_constraint_flag, a no_ciip_constraint_flag, a no_fpel_mmvd_constraint_flag, or a no_gpm_constraint_flag; and perform a bitstream conformance process that determines whether a bitstream that comprises an encoded representation of the video data conforms to a video coding standard based on the first syntax element.

Several coding tools are missing in the general constraint information syntax to provide general constraint controls. The missing flags are added into VVC 8 as shown in Table 3, below:

TABLE 3

| | Descriptor |
|---|---|
| general_constraint_info( ) { | |
|    no_mrl_constraint_flag | u(1) |
|    no_isp_constraint_flag | u(1) |

TABLE 3-continued

| | Descriptor |
|---|---|
| no_mip_constraint_flag | u(1) |
| no_lfnst_constraint_flag | u(1) |
| no_mmvd_constraint_flag | u(1) |
| no_smvd_constraint_flag | u(1) |
| no_prof_constraint_flag | u(1) |
| no_palette_constraint_flag | u(1) |
| no_act_constraint_flag | u(1) |
| no_lmcs_constraint_flag | u(1) |

Table 4, below, describes semantics of the syntax elements listed in Table 3.

TABLE 4 no_mrl_constraint_flag equal to 1 specifies that sps_mrl_enabled_flag shall be equal to 0. no_mrl_constraint_flag equal to 0 does not impose such a constraint.
no_isp_constraint_flag equal to 1 specifies that sps_isp_enabled_flag shall be equal to 0. no_isp_constraint_flag equal to 0 does not impose such a constraint.
no_mip_constraint_flag equal to 1 specifies that sps_mip_enabled_flag shall be equal to 0. no_mip_constraint_flag equal to 0 does not impose such a constraint.
no_lfnst_constraint_flag equal to 1 specifies that sps_lfnst_enabled_flag shall be equal to 0. no_lfnst_constraint_flag equal to 0 does not impose such a constraint.
no_mmvd_constraint_flag equal to 1 specifies that sps_mmvd_enabled_flag shall be equal to 0. no_mmvd_constraint_flag equal to 0 does not impose such a constraint. When intra_only_constraint_flag is equal to 1, the value of no_mmvd_constraint_flag shall be equal to 1.
no_smvd_constraint_flag equal to 1 specifies that sps_smvd_enabled_flag shall be equal to 0. no_smvd_constraint_flag equal to 0 does not impose such a constraint. When intra_only_constraint_flag is equal to 1, the value of no_smvd_constraint_flag shall be equal to 1.
no_prof_constraint_flag equal to 1 specifies that sps_affine_prof_enabled_flag shall be equal to 0. no_prof_constraint_flag equal to 0 does not impose such a constraint. When intra_only_constraint_flag is equal to 1, the value of no_prof_constraint_flag shall be equal to 1.
no_palette_constraint_flag equal to 1 specifies that sps_palette_enabled_flag shall be equal to 0. no_palette_constraint_flag equal to 0 does not impose such a constraint.
no_act_constraint_flag equal to 1 specifies that sps_act_enabled_flag shall be equal to 0. no_act_constraint_flag equal to 0 does not impose such a constraint.
no_lmcs_constraint_flag equal to 1 specifies that sps_lmcs_enabled_flag shall be equal to 0. no_lmcs_constraint_flag equal to 0 does not impose such a constraint.

The semantics of syntax elements mentioned in Table 4, above are provided in Table 5, below.

TABLE 5 sps_mrl_enabled_flag equal to 1 specifies that intra prediction with multiple reference lines is enabled. sps_mrl_enabled_flag equal to 0 specifies that intra prediction with multiple reference lines is disabled.
sps_isp_enabled_flag equal to 1 specifies that intra prediction with subpartitions is enabled. sps_isp_enabled_flag equal to 0 specifies that intra prediction with subpartitions is disabled.
sps_mip_enabled_flag equal to 1 specifies that matrix-based intra prediction is enabled. sps_mip_enabled_flag equal to 0 specifies that matrix-based intra prediction is disabled.
sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.
lfnst_idx specifies whether and which one of the two low frequency non-separable transform kernels in a selected transform set is used. lfnst_idx equal to 0 specifies that the low frequency non-separable transform is not used in the current coding unit.
sps_mmvd_enabled_flag equal to 1 specifies that merge mode with motion vector difference is enabled. sps_mmvd_enabled_flag equal to 0 specifies that merge mode with motion vector difference is disabled.
sps_smvd_enabled_flag equal to 1 specifies that symmetric motion vector difference may be used in motion vector decoding. sps_smvd_enabled_flag equal to 0 specifies that symmetric motion vector difference is not used in motion vector coding.
sps_affine_prof_enabled_flag specifies whether the prediction refinement with optical flow can be used for affine motion compensation. If sps_affine_prof_enabled_flag is equal to 0, the affine motion compensation shall not be refined with optical flow. Otherwise (sps_affine_prof_enabled_flag is equal to 1), the affine motion compensation can be refined with optical flow. When not present, the value of sps_affine_prof_enabled_flag is inferred to be equal to 0.
sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.
pred_mode_plt_flag specifies the use of palette mode in the current coding unit. pred_mode_plt_flag equal to 1 indicates that palette mode is applied in the current TABLE 5-continued coding unit. pred_mode_plt_flag equal to 0 indicates that palette mode is not applied in the current coding unit.
sps_act_enabled_flag equal to 1 specifies that adaptive colour transform may be used and the cu_act_enabled_flag may be present in the coding unit syntax. sps_act_enabled_flag equal to 0 speifies that adaptive colour transform is not used and cu_act_enabled_flag is not present in the coding unit syntax. When sps_act_enabled_flag is not present, it is inferred to be equal to 0.
cu_act_enabled_flag equal to 1 specifies that the residuals of the current coding unit are coded in $YC_gC_o$ colour space. cu_act_enabled_flag equal to 0 specifies that the residuals of the current coding unit are coded in original colour space. When cu_act_enabled_flag is not present, it is inferred to be equal to 0.
sps_lmcs_enabled_flag equal to 1 specifies that luma mapping with chroma scaling is used in the CLVS. sps_lmcs_enabled_flag equal to 0 specifies that luma mapping with chroma scaling is not used in the CLVS.

In another example, the flags are conditioned by intra_only_constraint_flag=1 as follows:

The signalling of no_mmvd_constraint_flag is omitted and inferred to be equal to 1 when intra_only_constraint_flag is equal to 1.

The signalling of no_smvd_constraint_flag is omitted and inferred to be equal to 1 when intra_only_constraint_flag is equal to 1.

The signalling of no_prof_constraint_flag is omitted and inferred to be equal to 1 when intra_only_constraint_flag is equal to 1.

Thus, in some examples, a device (e.g., source device 102, destination device 116, etc.) may perform a bitstream conformance process that determines whether a bitstream that comprises an encoded representation of the video data conforms to a video coding standard, wherein the bitstream conformance process determines, based on a first syntax element in a sequence parameter set (SPS) indicating that a coding tool is enabled, that the bitstream does not conform to the video coding standard when a second syntax element of the bitstream indicates that the first syntax element shall have a value indicating that the coding tool is not enabled. In such examples, the coding tool may be one of: intra prediction with multiple reference lines, intra prediction with subpartitions, matrix-based intra prediction, selection of a low frequency non-separable transform kernel based on an index, merge mode with motion vector difference, use of symmetric motion vector difference in motion vector decoding, prediction refinement with optical flow for affine motion compensation, palette prediction mode, adaptive color transform, or luma mapping with chroma scaling.

In some examples of this disclosure, new general constraint flags are added into the general constraint information syntax to define the features of single layer and single sublayer. The proposed changes to VVC 8 are shown by the <!> . . . </!> tags as shown in Table 6, below:

TABLE 6

|  | Descriptor |
| --- | --- |
| general_constraint_info( ) { |  |
|     general_progressive_source_flag | u(1) |
|     general_interlaced_source_flag | u(1) |
|     general_non_packed_constraint_flag | u(1) |
|     general_frame_only_constraint_flag | u(1) |
|     general_non_projected_constraint_flag | u(1) |
|     intra_only_constraint_flag | u(1) |
|     max_bitdepth_constraint_idc | u(4) |
|     max_chroma_format_constraint_idc | u(2) |
|     <!>single_layer_constraint_flag</!> | <!>u(1)</!> |
|     <!>single_sublayer_constraint_flag</!> | <!>u(1)</!> |
|     <!>single_sublayer_per_layer_constraint_flag</!> | <!>u(1)</!> |
|     <!>no_inter_layer_pred_constraint_flag</!> | <!>u(1)</!> |
|     no_res_change_in_clvs_constraint_flag | u(1) |
|     one_tile_per_pic_constraint_flag | u(1) |
|     one_slice_per_pic_constraint_flag | u(1) |
|     one_subpic_per_pic_constraint_flag | u(1) |

The semantics of the added syntax elements of Table 6 are presented in Table 7, below:

TABLE 7

<!>single_layer_constraint_flag equal to 1 specifies that it is a requirement of bitstream conformance that sps_video_parameter_set_id shall be equal to 0. single_layer_constraint_flag equal to 0 does not impose such a constraint.<!>
<!>single_sublayer_constraint_flag equal to 1 specifies it is a requirement of bitstream conformance that both sps_video_parameter_set_id and sps_max_sublayers_minus1 shall be equal to 0. single_sublayer_constraint_flag equal to 0 does not impose such a constraint.</!>
<!>single_sublayer_per_layer_constraint_flag equal to 1 specifies that it is a requirement of bitstream conformance that sps_max_sublayers_minus1 shall be equal to 0. single_sublayer_per_layer_constraint_flag equal to 0 does not impose such a constraint.</!>
<!>no_inter_layer_pred_constraint_flag equal to 1 specifies that it is a requirement of bitstream conformance that vps_all_independent_layers_flag shall be equal to 1. no_inter_layer_pred_constraint_flag equal to 0 does not impose such a constraint. When single_layer_constraint_flag is equal to 1, the value of no_inter_layer_pred_constraint_flag shall be equal to 1.</!>

Semantics of syntax elements mentioned in Table 7 are provided in Table 8, below.

TABLE 8 sps_video_parameter_set_id, when greater than 0, specifies the value of vps_video_parameter_set_id for the VPS referred to by the SPS.
When sps_video_parameter_set_id is equal to 0, the following applies:
- The SPS does not refer to a VPS.
- No VPS is referred to when decoding each CLVS referring to the SPS.
- The value of vps_max_layers_minus1 is inferred to be equal to 0.
- The CVS shall contain only one layer (i.e., all VCL NAL unit in the CVS shall have the same value of nuh_layer_id).
- The value of GeneralLayerIdx[ nuh_layer_id ] is inferred to be equal to 0.
- The value of vps_independent_layer_flag[ GeneralLayerIdx[ nuh_layer_id ] ] is inferred to be equal to 1.
When vps_independent_layer_flag[ GeneralLayerIdx[ nuh_layer_id ] ] is equal to 1, the SPS referred to by a CLVS with a particluar nuh_layer_id value nuhLayerId shall have nuh_layer_id equal to nuhLayerId.
The value of sps_video_parameter_set_id shall be the same in all SPSs that are referred to by CLVSs in a CVS.
sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.
vps_all_independent_layers_flag equal to 1 specifies that all layers in the CVS are independently coded without using inter-layer prediction.
vps_all_independent_layers_flag equal to 0 specifies that one or more of the layers in the CVS may use inter-layer prediction. When not present, the value of vps_all_independent_layers_flag is inferred to be equal to 1.

In another example, the flags are conditioned by single_layer_constraint_flag as follows:
The signalling of no_inter_layer_pred_constraint_flag is omitted and inferred to be equal to 1 when single_layer_constraint_flag is equal to 1.

Thus, in some such examples, a device (e.g., source device 102, destination device 116, etc.) may perform a bitstream conformance process that determines whether a bitstream that comprises an encoded representation of the video data conforms to a video coding standard. In these examples, the bitstream conformance process determines that the bitstream does not conform to the video coding standard based on a first syntax element (e.g., single_layer_constraint_flag, single_sublayer_constraint_flag, single_sublayer_per_layer_constraint_flag, or no_inter_layer_pred_constraint_flag) having a particular value indicating a requirement of bitstream conformance is applicable and based on the requirement of bitstream conformance not being satisfied. The requirement of bitstream conformance specifies one of: a second syntax element (e.g., sps_video_parameter_set_id) specifies a video parameter set (VPS) identifier of a sequence parameter set (SPS) shall be equal to 0, the second syntax element shall be equal to 0 and a third syntax element (e.g., sps_max_sublayers_minus1), plus 1, specifies that a maximum number of temporal sublayers that may be present in each coded layer video sequence (CLVS) shall be equal to 0, the third syntax element shall be equal to 0, or a fourth syntax element (e.g., vps_all_independent_layers_flag) shall specify that all layers in a coded video sequence (CVS) are independently coded without inter-layer prediction.

In some examples of this disclosure, no_vps_constraint_flag and no_ph_constraint_flag are added into the general constraint information syntax to define the features of VPS and PH. The proposed changes on top of VVC 8 are shown by the <!> . . . </!> tags as shown in Table 9, below:

TABLE 9

| | Descriptor |
|---|---|
| general_constraint_info( ) { | |
|     no_mixed_nalu_types_in_pic_constraint_flag | u(1) |
|     no_trail_constraint_flag | u(1) |
|     no_stsa_constraint_flag | u(1) |
|     no_rasl_constraint_flag | u(1) |
|     no_radl_constraint_flag | u(1) |
|     no_idr_constraint_flag | u(1) |
|     no_cra_constraint_flag | u(1) |
|     no_gdr_constraint_flag | u(1) |
| <!> no_vps_constraint_flag</!> | <!>u(1)</!> |
| <!> no_ph_constraint_flag</!> | <!>u(1)</!> |
|     no_aps_constraint_flag | u(1) |

Semantics of added syntax elements in Table 9 are described in Table 10, below.

TABLE 10

<!>no_vps_constraint_flag equal to 1 specifies that there shall be no NAL unit with nuh_unit_type equal to VPS_NUT present in OlsInScope. no_vps_constraint_flag equal to 0 does not impose such a constraint.</!>
<!>no_ph_constraint_flag equal to 1 specifies that there shall be no NAL unit with nuh_unit_type equal to PH_NUT present in OlsInScope. no_ph_constraint_flag equal to 0 does not impose such a constraint.</!>
no_stsa_constraint_flag equal to 1 specifies that there shall be no NAL unit with nuh_unit_type equal to STSA_NUT present in OlsInScope. no_stsa_constraint_flag equal to 0 does not impose such a constraint. <!>When single_sublayer_constraint_constraint_flag is equal to 1, the value of no_stsa_constraint_flag shall be equal to 1.</!>

Thus, in this example, a device (e.g., source device 102, destination device 116, etc.) may perform a bitstream conformance process that determines whether a bitstream that comprises an encoded representation of the video data conforms to a video coding standard. In this example, the bitstream conformance process determines that the bitstream does not conform to the video coding standard based on a first syntax element (e.g., no_vps_constraint_flag, no_ph_constraint_flag, etc.) having a particular value indicating a requirement of bitstream conformance is applicable and based on the requirement of bitstream conformance not being satisfied. The requirement of bitstream conformance specifies one of: there shall be no Network Abstraction Layer (NAL) unit in the bitstream with a NAL unit type equal to a Video Parameter Set (VPS) NAL unit type in an in-scope output layer set, or there shall be no NAL unit in the bitstream with a picture header NAL unit type in the in-scope output layer set.

Figure 3:
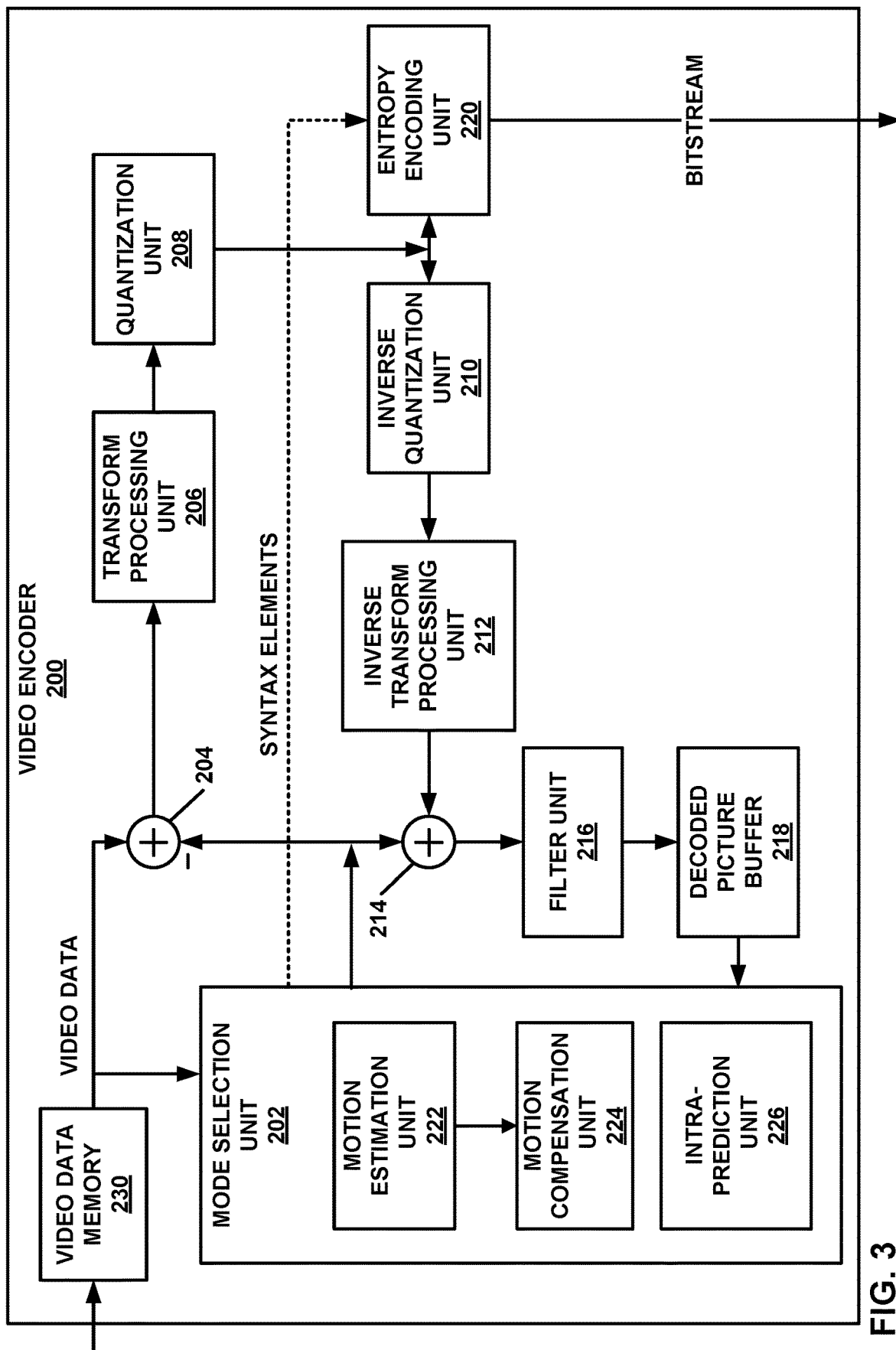
FIG. 3 is a block diagram illustrating an example video encoder.

FIG. 3 is a block diagram illustrating an example video encoder 200. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to encode a bitstream. In some examples, video encoder 200 may also perform a bitstream conformance process in accordance with any of the examples of this disclosure.

Figure 4:
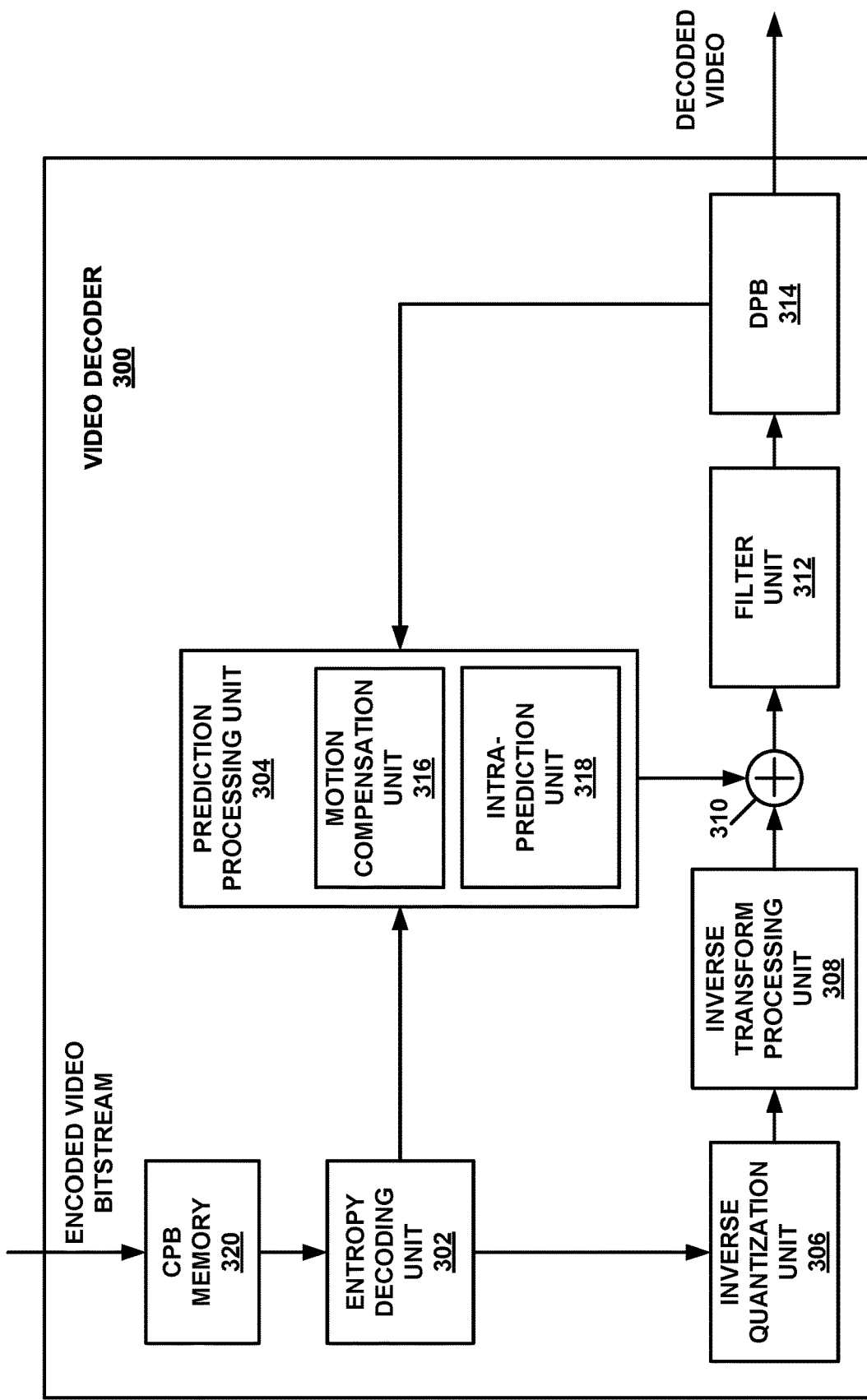
FIG. 4 is a block diagram illustrating an example video decoder.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to decode a bitstream. In some examples, video decoder 300 may also perform a bitstream conformance process in accordance with any of the examples of this disclosure.

Figure 5:
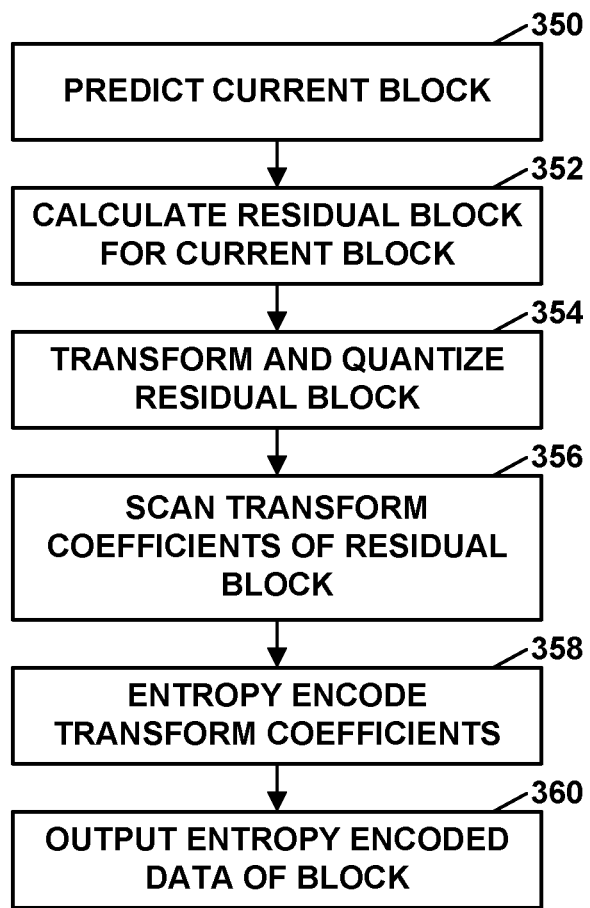
FIG. 5 is a flowchart illustrating an example method for encoding a current block.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 6:
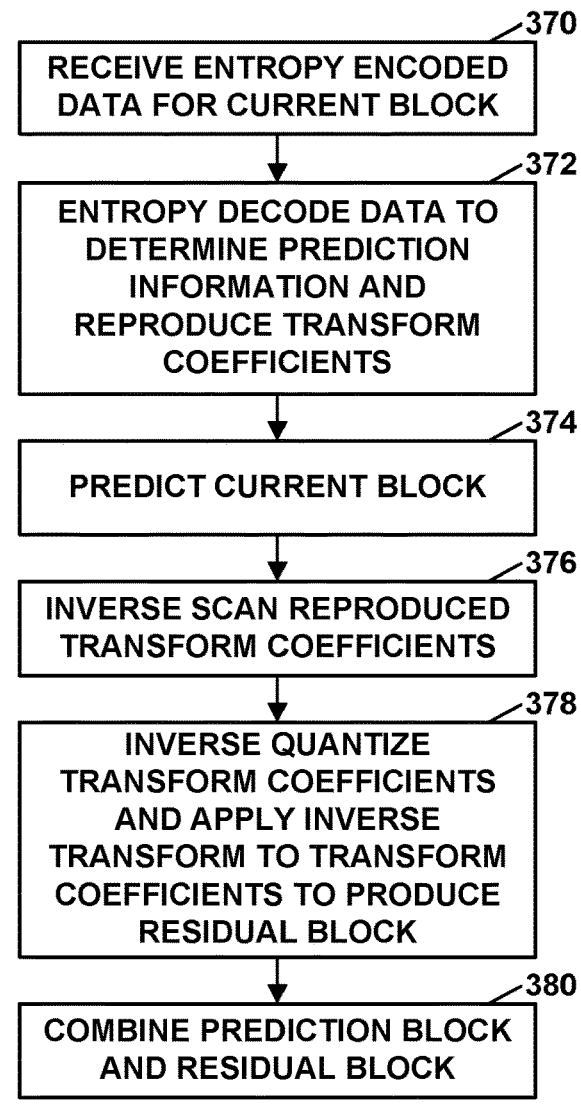
FIG. 6 is a flowchart illustrating an example method for decoding a current block of video data.

FIG. 6 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 6.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 7:
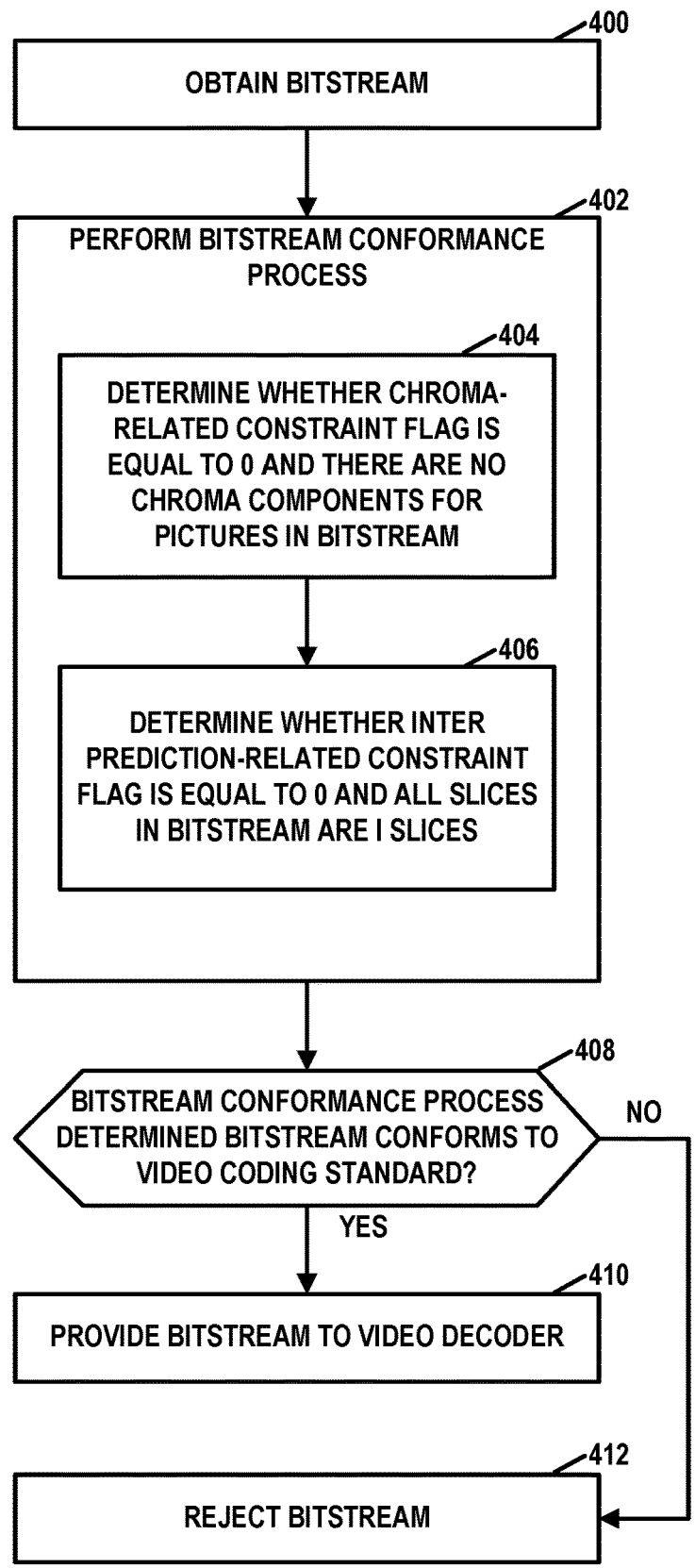
FIG. 7 is a flowchart illustrating an example process in accordance with one or more techniques of this disclosure.

FIG. 7 is a flowchart illustrating an example process in accordance with one or more techniques of this disclosure. The process of FIG. 7 may be performed by a system that includes one or more of source device 102, destination device 116, and/or another device. For instance, some actions of the process may be performed by source device 102, some actions of the process may be performed by destination device 116, and so on. Moreover, in some instances, only some of the actions shown in the example of FIG. 7 are performed.

In the example of FIG. 7, the system may obtain a bitstream that comprises an encoded representation of video data (400). For instance, in one example, the system (e.g., video encoder 200) may obtain the bitstream by encoding video data. In another example, the system may receive the bitstream, e.g., from source device 102. In some examples, the system may store the bitstream on a computer-readable medium (e.g., memory) and obtain the bitstream from the computer-readable medium.

Furthermore, in the example of FIG. 7, the system may perform a bitstream conformance process that determines whether a bitstream that comprises an encoded representation of the video data conforms to a video coding standard, such as VVC (402). As part of performing the bitstream conformance process, the system may determine that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices.

Thus, in the example of FIG. 7, the system may determine whether the chroma-related constraint flag is equal to 0 and there are no chroma components for pictures in the bitstream (404). In some examples, the chroma-related constraint flag is a syntax element (e.g., no_qtbtt_dual_tree_intra_constraint_flag) that indicates whether a quad-tree/binary-tree flag must specify that separate coding tree structures are not used for I slices. In some examples, the chroma-related constraint flag is a syntax element (e.g., no_ccalf_constraint_ flag) that indicates whether a cross-component adaptive loop filter flag must indicate that a cross-component adaptive loop filter is disabled. In some examples, the chroma-related constraint flag is a syntax element (e.g., no_joint_cbcr_constraint_flag) that indicates whether a joint coding of a chroma residuals flag must indicate that joint coding of chroma residuals is disabled. In some examples, the chroma-related constraint flag is a syntax element (e.g., no_cclm_constraint_flag) that indicates whether a cross-component linear model intra prediction flag must indicate that cross-component linear model intra prediction from a luma component to a chroma component is disabled.

Additionally, the system may determine whether the inter prediction-related constraint flag is equal to 0 and all slices in the bitstream are I slices (406). In some examples, the inter prediction-related constraint flag is a syntax element (e.g., no_ref_wraparound_constraint_flag) that specifies whether a wrap-around enabled flag (e.g., sps_rel_wraparound_enabled_flag) must indicate that horizontal wrap-around motion compensation is not applied in inter prediction. In some examples, the inter prediction-related constraint flag is a syntax element (e.g., no_temporal_mvp_constraint_flag) that specifies whether a temporal motion vector prediction enabled flag (e.g., sps_temporal_mvp_enabled_flag) must indicate that temporal motion vector predictors are not used in a coded layer video sequence (CLVS). In some examples, the inter prediction-related constraint flag is a syntax element (e.g., no_sbtmvp_constraint_flag) that specifies whether a subblock-based temporal motion vector prediction enabled flag (e.g., sps_sbtmvp_enabled_flag) must indicate that subblock-based temporal motion vector predictors are not used in the CLVS. In some examples, the inter prediction-related constraint flag is a syntax element (e.g., no_amvr_constraint_flag) that specifies whether an adaptive motion vector difference resolution enabled flag (e.g., sps_amvr_enabled_flag) must indicate that adaptive motion vector difference resolution is not used in motion vector coding. In some examples, the inter prediction-related constraint flag is a syntax element (e.g., no_bdof_constraint_ flag) that specifies whether a bi-directional optical flow inter prediction flag (e.g., sps_bdof_enabled_flag) must indicate that bi-directional optical flow inter prediction is disabled. In some examples, the inter prediction-related constraint flag is a syntax element (e.g., no_dmvr_constraint_flag) that specifies whether a decoder motion vector refinement enabled flag (e.g., sps_dmvr_enabled_flag) must indicate that decoder motion vector refinement is disabled. In some examples, the inter prediction-related constraint flag is a syntax element (e.g., no_affine_motion_constraint_flag) that specifies whether an affine enabled flag (e.g., sps_affined_enabled) must indicate that no affine model based motion compensation is used in the CLVS. In some examples, the inter prediction-related constraint flag is a syntax element (e.g., no_bcw_constraint_flag) that specifies whether a bi-prediction with coding unit (CU) weights flag (e.g., sps_bcw_enabled_flag) must indicate that no bi-prediction with CU weights is used in the CLVS. In some examples, the inter prediction-related constraint flag is a syntax element (e.g., no_ciip_constraint_flag) that specifies whether a combined inter-picture merge and intra-picture prediction (CIIP) flag (e.g., sps_ciip_enabled_flag) must indicate that there are no flags that indicate whether CIIP is applied for a coding unit. In some examples, the inter prediction-related constraint flag is a syntax element (e.g., no_fpel_mmvd_constraint_flag) that specifies whether a merge mode with motion vector difference flag (e.g., sps_fpel_mmvd_enabled_flag) must specify that merge mode with motion vector difference can use fractional sample precision. In some examples, the inter prediction-related constraint flag is a syntax element (e.g., no_gpm_constraint_flag) that specifies whether a geometric partition based motion compensation flag (e.g., sps_gpm_enabled_flag) must indicate that no geometric partition based motion compensation is used in the CLVS.

In some examples, when performing the bitstream conformance process, the device may determine that the bitstream does not conform to the video coding standard based on a first syntax element (e.g., single_layer_constraint_flag) having a particular value indicating a requirement of bitstream conformance is applicable and based on the requirement of bitstream conformance not being satisfied and the requirement of bitstream conformance specifies a second syntax element (e.g., sps_video_parameter_set_id) specifies a video parameter set (VPS) identifier of a sequence parameter set (SPS) shall be equal to 0.

In some examples, the device may determine that the bitstream does not conform to the video coding standard based on a first syntax element (e.g., single_sublayer_constraint_flag) having a particular value (e.g., 1) indicating a requirement of bitstream conformance is applicable and the requirement of bitstream conformance specifies a second syntax element (e.g., sps_video_parameter_set_id) shall be equal to 0 and a third syntax element (e.g., sps_max_sublayers_minus_1), plus 1, specifies that a maximum number of temporal sublayers that may be present in each coded layer video sequence (CLVS) shall be equal to 0.

In some examples, the device may determine that the bitstream does not conform to the video coding standard based on a first syntax element (e.g., single_sublayer_per_layer_constraint_flag) having a particular value (e.g., 1) indicating a requirement of bitstream conformance is applicable and the requirement of bitstream conformance specifies that the third syntax element (e.g., sps_max_sublayers_minus1) shall be equal to 0.

In some examples, the device may determine that the bitstream does not conform to the video coding standard based on a first syntax element (e.g., single_layer_constraint_flag) having a particular value indicating a requirement of bitstream conformance is applicable and the requirement of bitstream conformance specifies that the fourth syntax element (e.g., no_inter_layer_pred_constraint_flag) shall specify that all layers in the CVS are independently coded without inter-layer prediction. In this example, the device may determine that the first syntax element is omitted from the bitstream and is inferred to indicate that the requirement of bitstream conformance is applicable based on a fifth syntax element (e.g., single_layer_constraint_flag) specifying that it is a second requirement of bitstream conformance that the VPS identifier of the SPS shall be equal to 0.

In some examples, the system may determine that the bitstream does not conform to the video coding standard based on a first syntax element (e.g., no_inter_layer_pred_constraint_flag) having a particular value (e.g., 1) indicating a requirement of bitstream conformance is applicable and the requirement of bitstream conformance specifies a fourth syntax element (e.g., no_inter_layer_pred_constraint_flag) shall specify that all layers in a coded video sequence (CVS) are independently coded without inter-layer prediction.

In the example of FIG. 7, the system may determine whether the bitstream conformance process determined that the bitstream conforms to the video coding standard (408). In response to determining that the bitstream conforms to the video coding standard ("YES" branch of 408), the system may provide the bitstream to video decoder 300 (410). For instance, in some examples, the system may output the bitstream to computer-readable medium 110 for subsequent receipt by destination device 116. In some examples where the device includes video decoder 300, video decoder 300 may decode the bitstream. However, in response to determining that the bitstream does not conform to the video coding standard ("NO" branch of 408), the system may reject the bitstream (412). For instance, the system may generate an error message. Thus, in the example of FIG. 7, the device may generate an error message based on a determination that the bitstream does not conform to the video coding standard, send the bitstream to another device based on a determination that the bitstream conforms to the video coding standard, or decode the bitstream based on the determination that the bitstream conforms to the video coding standard.

The following is a non-limiting list of examples in accordance with one or more techniques of this disclosure.

Aspect 1A: A method of processing video data includes performing a bitstream conformance process that determines whether a bitstream that comprises an encoded representation of the video data conforms to a video coding standard, wherein the bitstream conformance process is able to determine that the bitstream conforms to the video coding standard regardless of a value of a first syntax element when a second syntax element indicates that only one slice is allowed per picture, the first syntax element indicating whether only one subpicture is allowed per subpicture.

Aspect 2A: A method of processing video data includes performing a bitstream conformance process that determines whether a bitstream that comprises an encoded representation of the video data conforms to a video coding standard, wherein the bitstream conformance process determines that the bitstream does not conform to the video coding standard when a chroma-related constraint flag is equal to 0 and when there are no chroma components for pictures in the bitstream.

Aspect 3A: The method of aspect 2A, wherein the chroma-related constraint flag is one of: a no_qtbtt_dual_tree_intra_constraint_flag, a no_ccalf_constraint_flag, a no_joint_cbcr_constraint_flag, or a no_cclm_constraint_flag.

Aspect 4A: A method of processing video data includes performing a bitstream conformance process that determines whether a bitstream that comprises an encoded representation of the video data conforms to a video coding standard, wherein the bitstream conformance process determines that the bitstream does not conform to the video coding standard when an inter prediction-related constraint flag is equal to 0 when all slices of the bitstream are I slices.

Aspect 5A: The method of aspect 4A, wherein the chroma-related constraint flag is one of: a no_ref_wraparound_constraint_flag, a no_temporal_mvp_constraint_flag, a no_sbtmvp_constraint_flag, a no_amvr_constraint_flag, a no_bdof_constraint_flag, a no_dmvr_constraint_flag, a no_affine_motion_constraint_flag, a no_bcw_constraint_flag, a no_ciip_constraint_flag, a no_fpel_mmvd_constraint_flag, or a no_gpm_constraint_flag.

Aspect 6A: A method of processing video data includes determining that a first syntax element is omitted from a bitstream and inferred to be equal to 1 based on a second syntax element indicating there are no chroma components in the bitstream and a third syntax element indicating that all slices of the bitstream are I slices, the first syntax element being one of: a no_qtbtt_dual_tree_intra_constraint_flag, a no_ccalf_constraint_flag, a no_joint_cbcr_constraint_flag, a no_cclm_constraint_flag, a no_ref_wraparound_constraint_flag, a no_temporal_mvp_constraint_flag, a no_sbtmvp_constraint_flag, a no_amvr_constraint_flag, a no_bdof_constraint_flag, a no_dmvr_constraint_flag, a no_affine_motion_constraint_flag, a no_bcw_constraint_flag, a no_ciip_constraint_flag, a no_fpel_mmvd_constraint_flag, or a no_gpm_constraint_flag; and performing a bitstream conformance process that determines whether a bitstream that comprises an encoded representation of the video data conforms to a video coding standard based on the first syntax element.

Aspect 7A: A method of processing video data includes performing a bitstream conformance process that determines whether a bitstream that comprises an encoded representation of the video data conforms to a video coding standard, wherein the bitstream conformance process determines, based on a first syntax element in a sequence parameter set (SPS) indicating that a coding tool is enabled, that the bitstream does not conform to the video coding standard when a second syntax element of the bitstream indicates that the first syntax element shall have a value indicating that the coding tool is not enabled.

Aspect 8A: The method of aspect 7A, wherein the coding tool is one of: intra prediction with multiple reference lines, intra prediction with subpartitions, matrix-based intra prediction, selection of a low frequency non-separable transform kernel based on an index, merge mode with motion vector difference, use of symmetric motion vector difference in motion vector decoding, prediction refinement with optical flow for affine motion compensation, palette prediction mode, adaptive color transform, or luma mapping with chroma scaling.

Aspect 9A: The method of aspect 7A, wherein: the coding tool is one of: merge mode with motion vector difference, use of symmetric motion vector difference in motion vector decoding, or prediction refinement with optical flow for affine motion compensation, and the method further comprises determining that the second syntax element is omitted from the bitstream and indicates that the first syntax element shall have the value indicating that the coding tool is not enabled based on a third syntax element indicating that all slices of the bitstream are I slices.

Aspect 10A: A method of processing video data includes performing a bitstream conformance process that determines whether a bitstream that comprises an encoded representation of the video data conforms to a video coding standard, wherein the bitstream conformance process determines that the bitstream does not conform to the video coding standard based on a first syntax element having a particular value indicating a requirement of bitstream conformance is applicable and based on the requirement of bitstream conformance not being satisfied, wherein the requirement of bitstream conformance specifies one of: a second syntax element specifies a video parameter set (VPS) identifier of a sequence parameter set (SPS) shall be equal to 0, the second syntax element shall be equal to 0 and a third syntax element, plus 1, specifies that a maximum number of temporal sublayers that may be present in each coded layer video sequence (CLVS) shall be equal to 0, the third syntax element shall be equal to 0, or a fourth syntax element shall specify that all layers in a coded video sequence (CVS) are independently coded without inter-layer prediction.

Aspect 11A: The method of aspect 10A, wherein: the requirement of bitstream conformance specifies that the fourth syntax element shall specify that all layers in the CVS are independently coded without inter-layer prediction, and the method further comprises determining that the first syntax element is omitted from the bitstream and is inferred to indicate that the requirement of bitstream conformance is applicable based on a fifth syntax element specifying that it is a second requirement of bitstream conformance that that VPS identifier of the SPS shall be equal to 0.

Aspect 12A: A method of processing video data includes performing a bitstream conformance process that determines whether a bitstream that comprises an encoded representation of the video data conforms to a video coding standard, wherein the bitstream conformance process determines that the bitstream does not conform to the video coding standard based on a first syntax element having a particular value indicating a requirement of bitstream conformance is applicable and based on the requirement of bitstream conformance not being satisfied, wherein the requirement of bitstream conformance specifies one of: there shall be no Network Abstraction Layer (NAL) unit in the bitstream with a NAL unit type equal to a Video Parameter Set (VPS) NAL unit type in an in-scope output layer set, or there shall be no NAL unit in the bitstream with a picture header NAL unit type in the in-scope output layer set.

Aspect 13A: The method of any of aspects 1A-12A, further comprising at least one of: generating an error message based on a determination that the bitstream does not conform to the video coding standard, sending the bitstream to another device based on a determination that the bitstream conforms to the video coding standard, or decoding the bitstream based on the determination that the bitstream conforms to the video coding standard.

Aspect 14A: A method comprising any combination of aspects 1A-13A.

Aspect 15A: A device for processing video data, the device comprising one or more means for performing the method of any of aspects 1A-14A.

Aspect 16A: The device of aspect 15A, wherein the one or more means comprise one or more processors implemented in circuitry.

Aspect 17A: The device of any of aspects 15A and 16A, further comprising a memory to store the video data.

Aspect 18A: The device of any of aspects 15A-17A, further comprising a display configured to display decoded video data.

Aspect 19A: The device of any of aspects 15A-18A, wherein the device comprises one or more of a camera, a computer, a mobile device, a broadcast receiver device, or a set-top box.

Aspect 20A: The device of any of aspects 15A-19A, wherein the device comprises a video decoder.

Aspect 21A: The device of any of aspects 15A-20A, wherein the device comprises a video encoder.

Aspect 22A: A computer-readable storage medium having stored thereon instructions that, when executed, cause one or more processors to perform the method of any of aspects 1A-14A.

Aspect 1B: A method of processing video data includes performing a bitstream conformance process that determines whether a bitstream that comprises an encoded representation of the video data conforms to a video coding standard, wherein the bitstream conformance process determines that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices.

Aspect 2B: The method of aspect 1B, wherein the chroma-related constraint flag is one of: a syntax element that indicates whether a quad-tree/binary-tree flag must specify that separate coding tree structures are not used for I slices, a syntax element that indicates whether a cross-component adaptive loop filter flag must indicate that a cross-component adaptive loop filter is disabled, a syntax element that indicates whether a joint coding of a chroma residuals flag must indicate that joint coding of chroma residuals is disabled, or a syntax element that indicates whether a cross-component linear model intra prediction flag must indicate that cross-component linear model intra prediction from a luma component to a chroma component is disabled.

Aspect 3: The method of any of aspects 1 and 2, wherein the intra prediction-related constraint flag is one of: a syntax element that specifies whether a wrap-around enabled flag must indicate that horizontal wrap-around motion compensation is not applied in inter prediction, a syntax element that specifies whether a temporal motion vector prediction enabled flag must indicate that temporal motion vector predictors are not used in a coded layer video sequence (CLVS), a syntax element that specifies whether a subblock-based temporal motion vector prediction enabled flag must indicate that subblock-based temporal motion vector predictors are not used in the CLVS, a syntax element that specifies whether an adaptive motion vector difference resolution enabled flag must indicate that adaptive motion vector difference resolution is not used in motion vector coding, a syntax element that specifies whether a bi-directional optical flow inter prediction flag must indicate that bi-directional optical flow inter prediction is disabled, a syntax element that specifies whether a decoder motion vector refinement enabled flag must indicate that decoder motion vector refinement is disabled, a syntax element that specifies whether an affine enabled flag must indicate that no affine model based motion compensation is used in the CLVS, a syntax element that specifies whether a bi-prediction with coding unit (CU) weights flag must indicate that no bi-prediction with CU weights is used in the CLVS, a syntax element that specifies whether a combined inter-picture merge and intra-picture prediction (CIIP) flag must indicate that there are no flags that indicate whether CIIP is applied for a coding unit, a syntax element that specifies whether a merge mode with motion vector difference flag must specify that merge mode with motion vector difference can use fractional sample precision, or a syntax element that specifies whether a geometric partition based motion compensation flag must indicate that no geometric partition based motion compensation is used in the CLVS.

Aspect 4B: The method of any of aspects 1B through 3B, wherein performing the bitstream conformance process further comprises: determining that the bitstream does not conform to the video coding standard based on a first syntax element having a particular value indicating a requirement of bitstream conformance is applicable and based on the requirement of bitstream conformance not being satisfied, wherein the requirement of bitstream conformance specifies one of: a second syntax element specifies a video parameter set (VPS) identifier of a sequence parameter set (SPS) shall be equal to 0, the second syntax element shall be equal to 0 and a third syntax element, plus 1, specifies that a maximum number of temporal sublayers that may be present in each coded layer video sequence (CLVS) shall be equal to 0, the third syntax element shall be equal to 0, or a fourth syntax element shall specify that all layers in a coded video sequence (CVS) are independently coded without inter-layer prediction.

Aspect 5B: The method of aspect 4B, wherein: the requirement of bitstream conformance specifies that the fourth syntax element shall specify that all layers in the CVS are independently coded without inter-layer prediction, and the method further comprises determining that the first syntax element is omitted from the bitstream and is inferred to indicate that the requirement of bitstream conformance is applicable based on a fifth syntax element specifying that it is a second requirement of bitstream conformance that the VPS identifier of the SPS shall be equal to 0.

Aspect 6B: The method of any of aspects 1B through 5B, further includes generating an error message based on a determination that the bitstream does not conform to the video coding standard, sending the bitstream to another device based on a determination that the bitstream conforms to the video coding standard, or decoding the bitstream based on the determination that the bitstream conforms to the video coding standard.

Aspect 7B: A device for processing video data includes a memory to store a bitstream that comprises an encoded representation of the video data conforms to a video coding standard; and one or more processors implemented in circuitry and coupled to the memory, the one or more processors configured to perform a bitstream conformance process that determines whether the bitstream conforms to a video coding standard, wherein the bitstream conformance process determines that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices.

Aspect 8B: The device of aspect 7B, wherein the chroma-related constraint flag is one of: a syntax element that indicates whether a quad-tree/binary-tree flag must specify that separate coding tree structures are not used for I slices, a syntax element that indicates whether a cross-component adaptive loop filter flag must indicate that a cross-component adaptive loop filter is disabled, a syntax element that indicates whether a joint coding of a chroma residuals flag must indicate that joint coding of chroma residuals is disabled, or a syntax element that indicates whether a cross-component linear model intra prediction flag must indicate that cross-component linear model intra prediction from a luma component to a chroma component is disabled.

Aspect 9B: The device of any of aspects 7B and 8B, wherein the intra prediction-related constraint flag is one of: a syntax element that specifies whether a wrap-around enabled flag must indicate that horizontal wrap-around motion compensation is not applied in inter prediction, a syntax element that specifies whether a temporal motion vector prediction enabled flag must indicate that temporal motion vector predictors are not used in a coded layer video sequence (CLVS), a syntax element that specifies whether a subblock-based temporal motion vector prediction enabled flag must indicate that subblock-based temporal motion vector predictors are not used in the CLVS, a syntax element that specifies whether an adaptive motion vector difference resolution enabled flag must indicate that adaptive motion vector difference resolution is not used in motion vector coding, a syntax element that specifies whether a bi-directional optical flow inter prediction flag must indicate that bi-directional optical flow inter prediction is disabled, a syntax element that specifies whether a decoder motion vector refinement enabled flag must indicate that decoder motion vector refinement is disabled, a syntax element that specifies whether an affine enabled flag must indicate that no affine model based motion compensation is used in the CLVS, a syntax element that specifies whether a bi-prediction with coding unit (CU) weights flag must indicate that no bi-prediction with CU weights is used in the CLVS, a syntax element that specifies whether a combined inter-picture merge and intra-picture prediction (CIIP) flag must indicate that there are no flags that indicate whether CIIP is applied for a coding unit, a syntax element that specifies whether a merge mode with motion vector difference flag must specify that merge mode with motion vector difference can use fractional sample precision, or a syntax element that specifies whether a geometric partition based motion compensation flag must indicate that no geometric partition based motion compensation is used in the CLVS.

Aspect 10B: The device of any of aspects 7B through 9B, wherein the one or more processors are configured to, as part performing the bitstream conformance process: determine that the bitstream does not conform to the video coding standard based on a first syntax element having a particular value indicating a requirement of bitstream conformance is applicable and based on the requirement of bitstream conformance not being satisfied, wherein the requirement of bitstream conformance specifies one of: a second syntax element specifies a video parameter set (VPS) identifier of a sequence parameter set (SPS) shall be equal to 0, the second syntax element shall be equal to 0 and a third syntax element, plus 1, specifies that a maximum number of temporal sublayers that may be present in each coded layer video sequence (CLVS) shall be equal to 0, the third syntax element shall be equal to 0, or a fourth syntax element shall specify that all layers in a coded video sequence (CVS) are independently coded without inter-layer prediction.

Aspect 11B: The device of aspect 10B, wherein: the requirement of bitstream conformance specifies that the fourth syntax element shall specify that all layers in the CVS are independently coded without inter-layer prediction, and the method further comprises determining that the first syntax element is omitted from the bitstream and is inferred to indicate that the requirement of bitstream conformance is applicable based on a fifth syntax element specifying that it is a second requirement of bitstream conformance that that VPS identifier of the SPS shall be equal to 0.

Aspect 12B: The device of any of aspects 7B through 11B, wherein the one or more processors are further configured to perform at least one of: generating an error message based on a determination that the bitstream does not conform to the video coding standard, sending the bitstream to another device based on a determination that the bitstream conforms to the video coding standard, or decoding the bitstream based on the determination that the bitstream conforms to the video coding standard.

Aspect 13B: The device of any of aspects 7B through 12B, wherein the device comprises one or more of a camera, a computer, a mobile device, a broadcast receiver device, or a set-top box.

Aspect 14B: A device for processing video data includes means for storing a bitstream that comprises an encoded representation of the video data; and means for performing a bitstream conformance process that determines whether the bitstream conforms to a video coding standard, wherein the bitstream conformance process determines that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices.

Aspect 15B: The device of aspect 14B, wherein the chroma-related constraint flag is one of: a syntax element that indicates whether a quad-tree/binary-tree flag must specify that separate coding tree structures are not used for I slices, a syntax element that indicates whether a cross-component adaptive loop filter flag must indicate that a cross-component adaptive loop filter is disabled, a syntax element that indicates whether a joint coding of a chroma residuals flag must indicate that joint coding of chroma residuals is disabled, or a syntax element that indicates whether a cross-component linear model intra prediction flag must indicate that cross-component linear model intra prediction from a luma component to a chroma component is disabled.

Aspect 16B: The device of any of aspects 14B and 15B, wherein the intra prediction-related constraint flag is one of: a syntax element that specifies whether a wrap-around enabled flag must indicate that horizontal wrap-around motion compensation is not applied in inter prediction, a syntax element that specifies whether a temporal motion vector prediction enabled flag must indicate that temporal motion vector predictors are not used in a coded layer video sequence (CLVS), a syntax element that specifies whether a subblock-based temporal motion vector prediction enabled flag must indicate that subblock-based temporal motion vector predictors are not used in the CLVS, a syntax element that specifies whether an adaptive motion vector difference resolution enabled flag must indicate that adaptive motion vector difference resolution is not used in motion vector coding, a syntax element that specifies whether a bi-directional optical flow inter prediction flag must indicate that bi-directional optical flow inter prediction is disabled, a syntax element that specifies whether a decoder motion vector refinement enabled flag must indicate that decoder motion vector refinement is disabled, a syntax element that specifies whether an affine enabled flag must indicate that no affine model based motion compensation is used in the CLVS, a syntax element that specifies whether a bi-prediction with coding unit (CU) weights flag must indicate that no bi-prediction with CU weights is used in the CLVS, a syntax element that specifies whether a combined inter-picture merge and intra-picture prediction (CIIP) flag must indicate that there are no flags that indicate whether CIIP is applied for a coding unit, a syntax element that specifies whether a merge mode with motion vector difference flag must specify that merge mode with motion vector difference can use fractional sample precision, or a syntax element that specifies whether a geometric partition based motion compensation flag must indicate that no geometric partition based motion compensation is used in the CLVS.

Aspect 17B: A computer-readable storage medium having stored thereon instructions that, when executed, cause one or more processors to: store a bitstream that comprises an encoded representation of video data; and perform a bitstream conformance process that determines whether the bitstream conforms to a video coding standard, wherein the bitstream conformance process determines that the bitstream does not conform to the video coding standard when at least one of: a chroma-related constraint flag is equal to 0 and when there are no chroma components for pictures in the bitstream, or an inter prediction-related constraint flag is equal to 0 when all slices of the bitstream are I slices.

Aspect 18B: The computer-readable storage medium of aspect 17B, wherein the chroma-related constraint flag is one of: a syntax element that indicates whether a quad-tree/binary-tree flag must specify that separate coding tree structures are not used for I slices, a syntax element that indicates whether a cross-component adaptive loop filter flag must indicate that a cross-component adaptive loop filter is disabled, a syntax element that indicates whether a joint coding of a chroma residuals flag must indicate that joint coding of chroma residuals is disabled, or a syntax element that indicates whether a cross-component linear model intra prediction flag must indicate that cross-component linear model intra prediction from a luma component to a chroma component is disabled.

Aspect 19B: The computer-readable storage medium of aspect 18B, wherein the intra prediction-related constraint flag is one of: a syntax element that specifies whether a wrap-around enabled flag must indicate that horizontal wrap-around motion compensation is not applied in inter prediction, a syntax element that specifies whether a temporal motion vector prediction enabled flag must indicate that temporal motion vector predictors are not used in a coded layer video sequence (CLVS), a syntax element that specifies whether a subblock-based temporal motion vector prediction enabled flag must indicate that subblock-based temporal motion vector predictors are not used in the CLVS, a syntax element that specifies whether an adaptive motion vector difference resolution enabled flag must indicate that adaptive motion vector difference resolution is not used in motion vector coding, a syntax element that specifies whether a bi-directional optical flow inter prediction flag must indicate that bi-directional optical flow inter prediction is disabled, a syntax element that specifies whether a decoder motion vector refinement enabled flag must indicate that decoder motion vector refinement is disabled, a syntax element that specifies whether an affine enabled flag must indicate that no affine model based motion compensation is used in the CLVS, a syntax element that specifies whether a bi-prediction with coding unit (CU) weights flag must indicate that no bi-prediction with CU weights is used in the CLVS, a syntax element that specifies whether a combined inter-picture merge and intra-picture prediction (CIIP) flag must indicate that there are no flags that indicate whether CIIP is applied for a coding unit, a syntax element that specifies whether a merge mode with motion vector difference flag must specify that merge mode with motion vector difference can use fractional sample precision, or a syntax element that specifies whether a geometric partition based motion compensation flag must indicate that no geometric partition based motion compensation is used in the CLVS.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In this disclosure, references ordinal terms, e.g., first, second, etc., do not necessary indicate an order, but may merely be used to differentiate separate items.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
    performing a bitstream conformance process that determines whether a bitstream that comprises an encoded representation of the video data conforms to a video coding standard, wherein performing the bitstream conformance process comprises determining that the bitstream does not conform to the video coding standard based on a first syntax element having a particular value indicating a requirement of bitstream conformance is applicable and based on the requirement of bitstream conformance not being satisfied, and wherein the requirement of bitstream conformance specifies a second syntax element shall specify that all layers in a coded video sequence (CVS) are independently coded without inter-layer prediction.

2. The method of claim 1, wherein the bitstream conformance process determines that the bitstream does not conform to the video coding standard when a chroma-related constraint flag is equal to 0 and when there are no chroma components for pictures in the bitstream, wherein the chroma-related constraint flag is one of:
    a syntax element that indicates whether a quad-tree/binary-tree flag must specify that separate coding tree structures are not used for I slices,
    a syntax element that indicates whether a cross-component adaptive loop filter flag must indicate that a cross-component adaptive loop filter is disabled,
    a syntax element that indicates whether a joint coding of a chroma residuals flag must indicate that joint coding of chroma residuals is disabled, or
    a syntax element that indicates whether a cross-component linear model intra prediction flag must indicate that cross-component linear model intra prediction from a luma component to a chroma component is disabled.

3. The method of claim 1, wherein the bitstream conformance process determines that the bitstream does not conform to the video coding standard when an inter prediction-related constraint flag is equal to 0 and all slices of the bitstream are I slices, wherein the inter prediction-related constraint flag is one of:
    a syntax element that specifies whether a wrap-around enabled flag must indicate that horizontal wrap-around motion compensation is not applied in inter prediction,
    a syntax element that specifies whether a temporal motion vector prediction enabled flag must indicate that temporal motion vector predictors are not used in a coded layer video sequence (CLVS),
    a syntax element that specifies whether a subblock-based temporal motion vector prediction enabled flag must indicate that subblock-based temporal motion vector predictors are not used in the CLVS,
    a syntax element that specifies whether an adaptive motion vector difference resolution enabled flag must indicate that adaptive motion vector difference resolution is not used in motion vector coding,
    a syntax element that specifies whether a bi-directional optical flow inter prediction flag must indicate that bi-directional optical flow inter prediction is disabled,
    a syntax element that specifies whether a decoder motion vector refinement enabled flag must indicate that decoder motion vector refinement is disabled,
    a syntax element that specifies whether an affine enabled flag must indicate that no affine model based motion compensation is used in the CLVS,
    a syntax element that specifies whether a bi-prediction with coding unit (CU) weights flag must indicate that no bi-prediction with CU weights is used in the CLVS,
    a syntax element that specifies whether a combined inter-picture merge and intra-picture prediction (CIIP) flag must indicate that there are no flags that indicate whether CIIP is applied for a coding unit,
    a syntax element that specifies whether a merge mode with motion vector difference flag must specify that merge mode with motion vector difference can use fractional sample precision, or
    a syntax element that specifies whether a geometric partition based motion compensation flag must indicate that no geometric partition based motion compensation is used in the CLVS.

4. The method of claim 1, wherein:
    the requirement of bitstream conformance specifies that the second syntax element shall specify that all layers in the CVS are independently coded without inter-layer prediction, and
    the method further comprises determining that the first syntax element is omitted from the bitstream and is inferred to indicate that the requirement of bitstream conformance is applicable based on a third syntax element specifying that it is a second requirement of bitstream conformance that a VPS identifier of the SPS shall be equal to 0.

5. The method of claim 1, further comprising at least one of:
    generating an error message based on a determination that the bitstream does not conform to the video coding standard,
    sending the bitstream to another device based on a determination that the bitstream conforms to the video coding standard, or
    decoding the bitstream based on the determination that the bitstream conforms to the video coding standard.

6. A device for processing video data, the device comprising:
    a memory to store a bitstream that comprises an encoded representation of the video data conforms to a video coding standard; and
    one or more processors implemented in circuitry and coupled to the memory, the one or more processors configured to perform a bitstream conformance process that determines whether the bitstream conforms to a video coding standard, wherein the one or more processors are configured to, as part of performing the bitstream conformance process, determine that the bitstream does not conform to the video coding standard based on a first syntax element having a particular value indicating a requirement of bitstream conformance is applicable and based on the requirement of bitstream conformance not being satisfied, and wherein the requirement of bitstream conformance specifies a second syntax element shall specify that all layers in a coded video sequence (CVS) are independently coded without inter-layer prediction.

7. The device of claim 6, wherein the bitstream conformance process determines that the bitstream does not conform to the video coding standard when a chroma-related constraint flag is equal to 0 and when there are no chroma components for pictures in the bitstream, wherein the chroma-related constraint flag is one of:
  a syntax element that indicates whether a quad-tree/binary-tree flag must specify that separate coding tree structures are not used for I slices,
  a syntax element that indicates whether a cross-component adaptive loop filter flag must indicate that a cross-component adaptive loop filter is disabled,
  a syntax element that indicates whether a joint coding of a chroma residuals flag must indicate that joint coding of chroma residuals is disabled, or
  a syntax element that indicates whether a cross-component linear model intra prediction flag must indicate that cross-component linear model intra prediction from a luma component to a chroma component is disabled.

8. The device of claim 6, wherein the bitstream conformance process determines that the bitstream does not conform to the video coding standard when an inter prediction-related constraint flag is equal to 0 and all slices of the bitstream are I slices, wherein the inter prediction-related constraint flag is one of:
  a syntax element that specifies whether a wrap-around enabled flag must indicate that horizontal wrap-around motion compensation is not applied in inter prediction,
  a syntax element that specifies whether a temporal motion vector prediction enabled flag must indicate that temporal motion vector predictors are not used in a coded layer video sequence (CLVS),
  a syntax element that specifies whether a subblock-based temporal motion vector prediction enabled flag must indicate that subblock-based temporal motion vector predictors are not used in the CLVS,
  a syntax element that specifies whether an adaptive motion vector difference resolution enabled flag must indicate that adaptive motion vector difference resolution is not used in motion vector coding,
  a syntax element that specifies whether a bi-directional optical flow inter prediction flag must indicate that bi-directional optical flow inter prediction is disabled,
  a syntax element that specifies whether a decoder motion vector refinement enabled flag must indicate that decoder motion vector refinement is disabled,
  a syntax element that specifies whether an affine enabled flag must indicate that no affine model based motion compensation is used in the CLVS,
  a syntax element that specifies whether a bi-prediction with coding unit (CU) weights flag must indicate that no bi-prediction with CU weights is used in the CLVS,
  a syntax element that specifies whether a combined inter-picture merge and intra-picture prediction (CIIP) flag must indicate that there are no flags that indicate whether CIIP is applied for a coding unit,
  a syntax element that specifies whether a merge mode with motion vector difference flag must specify that merge mode with motion vector difference can use fractional sample precision, or
  a syntax element that specifies whether a geometric partition based motion compensation flag must indicate that no geometric partition based motion compensation is used in the CLVS.

9. The device of claim 6, wherein:
  the requirement of bitstream conformance specifies that the second syntax element shall specify that all layers in the CVS are independently coded without inter-layer prediction, and
  the method further comprises determining that the first syntax element is omitted from the bitstream and is inferred to indicate that the requirement of bitstream conformance is applicable based on a third syntax element specifying that it is a second requirement of bitstream conformance that a VPS identifier of the SPS shall be equal to 0.

10. The device of claim 6, wherein the one or more processors are further configured to perform at least one of:
  generating an error message based on a determination that the bitstream does not conform to the video coding standard,
  sending the bitstream to another device based on a determination that the bitstream conforms to the video coding standard, or
  decoding the bitstream based on the determination that the bitstream conforms to the video coding standard.

11. The device of claim 6, wherein the device comprises one or more of a camera, a computer, a mobile device, a broadcast receiver device, or a set-top box.

12. A device for processing video data, the device comprising:
  means for storing a bitstream that comprises an encoded representation of the video data; and
  means for performing a bitstream conformance process that determines whether the bitstream conforms to a video coding standard, wherein the bitstream conformance process determines that the bitstream does not conform to the video coding standard based on a first syntax element having a particular value indicating a requirement of bitstream conformance is applicable and based on the requirement of bitstream conformance not being satisfied, and wherein the requirement of bitstream conformance specifies a second syntax element shall specify that all layers in a coded video sequence (CVS) are independently coded without inter-layer prediction.

13. The device of claim 12, wherein the bitstream conformance process determines that the bitstream does not conform to the video coding standard when a chroma-related constraint flag is equal to 0 and when there are no chroma components for pictures in the bitstream, wherein the chroma-related constraint flag is one of:
  a syntax element that indicates whether a quad-tree/binary-tree flag must specify that separate coding tree structures are not used for I slices,
  a syntax element that indicates whether a cross-component adaptive loop filter flag must indicate that a cross-component adaptive loop filter is disabled,
  a syntax element that indicates whether a joint coding of a chroma residuals flag must indicate that joint coding of chroma residuals is disabled, or a syntax element that indicates whether a cross-component linear model intra prediction flag must indicate that cross-component linear model intra prediction from a luma component to a chroma component is disabled.

14. The device of claim 12, wherein the bitstream conformance process determines that the bitstream does not conform to the video coding standard when an inter prediction-related constraint flag is equal to 0 and all slices of the bitstream are I slices, wherein the inter prediction-related constraint flag is one of:
a syntax element that specifies whether a wrap-around enabled flag must indicate that horizontal wrap-around motion compensation is not applied in inter prediction,
a syntax element that specifies whether a temporal motion vector prediction enabled flag must indicate that temporal motion vector predictors are not used in a coded layer video sequence (CLVS),
a syntax element that specifies whether a subblock-based temporal motion vector prediction enabled flag must indicate that subblock-based temporal motion vector predictors are not used in the CLVS,
a syntax element that specifies whether an adaptive motion vector difference resolution enabled flag must indicate that adaptive motion vector difference resolution is not used in motion vector coding,
a syntax element that specifies whether a bi-directional optical flow inter prediction flag must indicate that bi-directional optical flow inter prediction is disabled,
a syntax element that specifies whether a decoder motion vector refinement enabled flag must indicate that decoder motion vector refinement is disabled,
a syntax element that specifies whether an affine enabled flag must indicate that no affine model based motion compensation is used in the CLVS,
a syntax element that specifies whether a bi-prediction with coding unit (CU) weights flag must indicate that no bi-prediction with CU weights is used in the CLVS,
a syntax element that specifies whether a combined inter-picture merge and intra-picture prediction (CIIP) flag must indicate that there are no flags that indicate whether CIIP is applied for a coding unit,
a syntax element that specifies whether a merge mode with motion vector difference flag must specify that merge mode with motion vector difference can use fractional sample precision, or
a syntax element that specifies whether a geometric partition based motion compensation flag must indicate that no geometric partition based motion compensation is used in the CLVS.

15. A non-transitory computer-readable storage medium having stored thereon instructions that, when executed, cause one or more processors to:
store a bitstream that comprises an encoded representation of video data; and
perform a bitstream conformance process that determines whether the bitstream conforms to a video coding standard, wherein the bitstream conformance process determines that the bitstream does not conform to the video coding standard based on a first syntax element having a particular value indicating a requirement of bitstream conformance is applicable and based on the requirement of bitstream conformance not being satisfied, and wherein the requirement of bitstream conformance specifies a second syntax element shall specify that all layers in a coded video sequence (CVS) are independently coded without inter-layer prediction.

16. The non-transitory computer-readable storage medium of claim 15, wherein the bitstream conformance process determines that the bitstream does not conform to the video coding standard when a chroma-related constraint flag is equal to 0 and when there are no chroma components for pictures in the bitstream, wherein the chroma-related constraint flag is one of:
a syntax element that indicates whether a quad-tree/binary-tree flag must specify that separate coding tree structures are not used for I slices,
a syntax element that indicates whether a cross-component adaptive loop filter flag must indicate that a cross-component adaptive loop filter is disabled,
a syntax element that indicates whether a joint coding of a chroma residuals flag must indicate that joint coding of chroma residuals is disabled, or
a syntax element that indicates whether a cross-component linear model intra prediction flag must indicate that cross-component linear model intra prediction from a luma component to a chroma component is disabled.

17. The non-transitory computer-readable storage medium of claim 16, wherein the bitstream conformance process determines that the bitstream does not conform to the video coding standard when an inter prediction-related constraint flag is equal to 0 and all slices of the bitstream are I slices, wherein the inter prediction-related constraint flag is one of:
a syntax element that specifies whether a wrap-around enabled flag must indicate that horizontal wrap-around motion compensation is not applied in inter prediction,
a syntax element that specifies whether a temporal motion vector prediction enabled flag must indicate that temporal motion vector predictors are not used in a coded layer video sequence (CLVS),
a syntax element that specifies whether a subblock-based temporal motion vector prediction enabled flag must indicate that subblock-based temporal motion vector predictors are not used in the CLVS,
a syntax element that specifies whether an adaptive motion vector difference resolution enabled flag must indicate that adaptive motion vector difference resolution is not used in motion vector coding,
a syntax element that specifies whether a bi-directional optical flow inter prediction flag must indicate that bi-directional optical flow inter prediction is disabled,
a syntax element that specifies whether a decoder motion vector refinement enabled flag must indicate that decoder motion vector refinement is disabled,
a syntax element that specifies whether an affine enabled flag must indicate that no affine model based motion compensation is used in the CLVS,
a syntax element that specifies whether a bi-prediction with coding unit (CU) weights flag must indicate that no bi-prediction with CU weights is used in the CLVS,
a syntax element that specifies whether a combined inter-picture merge and intra-picture prediction (CIIP) flag must indicate that there are no flags that indicate whether CIIP is applied for a coding unit,
a syntax element that specifies whether a merge mode with motion vector difference flag must specify that merge mode with motion vector difference can use fractional sample precision, or a syntax element that specifies whether a geometric partition based motion compensation flag must indicate that no geometric partition based motion compensation is used in the CLVS.

* * * * *